United States Patent
Tatsuzawa

(10) Patent No.: US 11,770,641 B2
(45) Date of Patent: Sep. 26, 2023

(54) SOLID-STATE IMAGE CAPTURING ELEMENT, IMAGE CAPTURING APPARATUS, AND METHOD OF CONTROLLING SOLID-STATE IMAGE CAPTURING ELEMENT

(71) Applicant: SONY SEMICONDUCTOR SOLUTIONS CORPORATION, Kanagawa (JP)

(72) Inventor: Yukiyasu Tatsuzawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/756,562

(22) PCT Filed: Dec. 1, 2020

(86) PCT No.: PCT/JP2020/044590
§ 371 (c)(1),
(2) Date: May 26, 2022

(87) PCT Pub. No.: WO2021/112058
PCT Pub. Date: Jun. 10, 2021

(65) Prior Publication Data
US 2022/0417464 A1 Dec. 29, 2022

(30) Foreign Application Priority Data
Dec. 6, 2019 (JP) .................... 2019-220810

(51) Int. Cl.
*H04N 25/772* (2023.01)
*H04N 25/71* (2023.01)
*H04N 25/677* (2023.01)

(52) U.S. Cl.
CPC ......... *H04N 25/772* (2023.01); *H04N 25/677* (2023.01); *H04N 25/745* (2023.01)

(58) Field of Classification Search
CPC .................................................. H04N 25/772
(Continued)

(56) References Cited

U.S. PATENT DOCUMENTS

| | | |
|---|---|---|
| 2009/0128653 A1 | 5/2009 | Tanaka |
| 2012/0119063 A1* | 5/2012 | Takamiya .............. H04N 25/75 250/208.1 |
| 2017/0085823 A1* | 3/2017 | Kizu ....................... H03M 1/08 |

FOREIGN PATENT DOCUMENTS

| | | |
|---|---|---|
| JP | 2009-124513 A | 6/2009 |
| JP | 2017-060071 A | 3/2017 |
| JP | 2019-197940 A | 11/2019 |

OTHER PUBLICATIONS

International Search Report and Written Opinion of PCT Application No. PCT/JP2020/044590, dated Feb. 16, 2021, 08 pages of ISRWO.

* cited by examiner

*Primary Examiner* — Joel W Fosselman
(74) *Attorney, Agent, or Firm* — CHIP LAW GROUP

(57) ABSTRACT

Noise is reduced in a solid-state image capturing element provided with an ADC for each column. An analog-to-digital converter increases or decreases an analog signal using an analog gain selected from among a plurality of analog gains, and converts the increased or decreased analog signal to a digital signal. An input switching section inputs, as the analog signal, one of a test signal having a predetermined level and a pixel signal to the analog-to-digital converter. In a case where a test signal is inputted, a correction value calculation section obtains, from the analog signal and the digital signal, a correction value for correcting (Continued)

an error in the selected analog gain, and outputs the correction value. A correction section, when inputted with the pixel signal after the correction value is outputted, corrects the digital signal using the correction value.

11 Claims, 31 Drawing Sheets

(58) Field of Classification Search
USPC .......................................................... 348/241
See application file for complete search history.

FIG.14

| | T4 | T5 | T6 | T7 | T8 |
|---|---|---|---|---|---|
| CAPTURING START SIGNAL | | | | | |
| COLUMN SIGNAL PROCESSING SECTION (280) | FRAME F3 | FRAME F4 | FRAME F5 | FRAME F6 | |
| Vsync | | | | | |
| CORRECTION VALUE CALCULATION SECTION (320) | | CALCULATION | CALCULATION | CALCULATION | CALCULATION |
| MEASUREMENT TARGET DOMAIN INFORMATION (360) | 0 | 1 | 3 | 0 | |
| CORRECTION TARGET DOMAIN INFORMATION (360) | 1 | | 2 | | |
| OUTPUT SWITCHING SIGNAL (360) | | | | | |
| UPDATE PULSE (310) | | | | | |

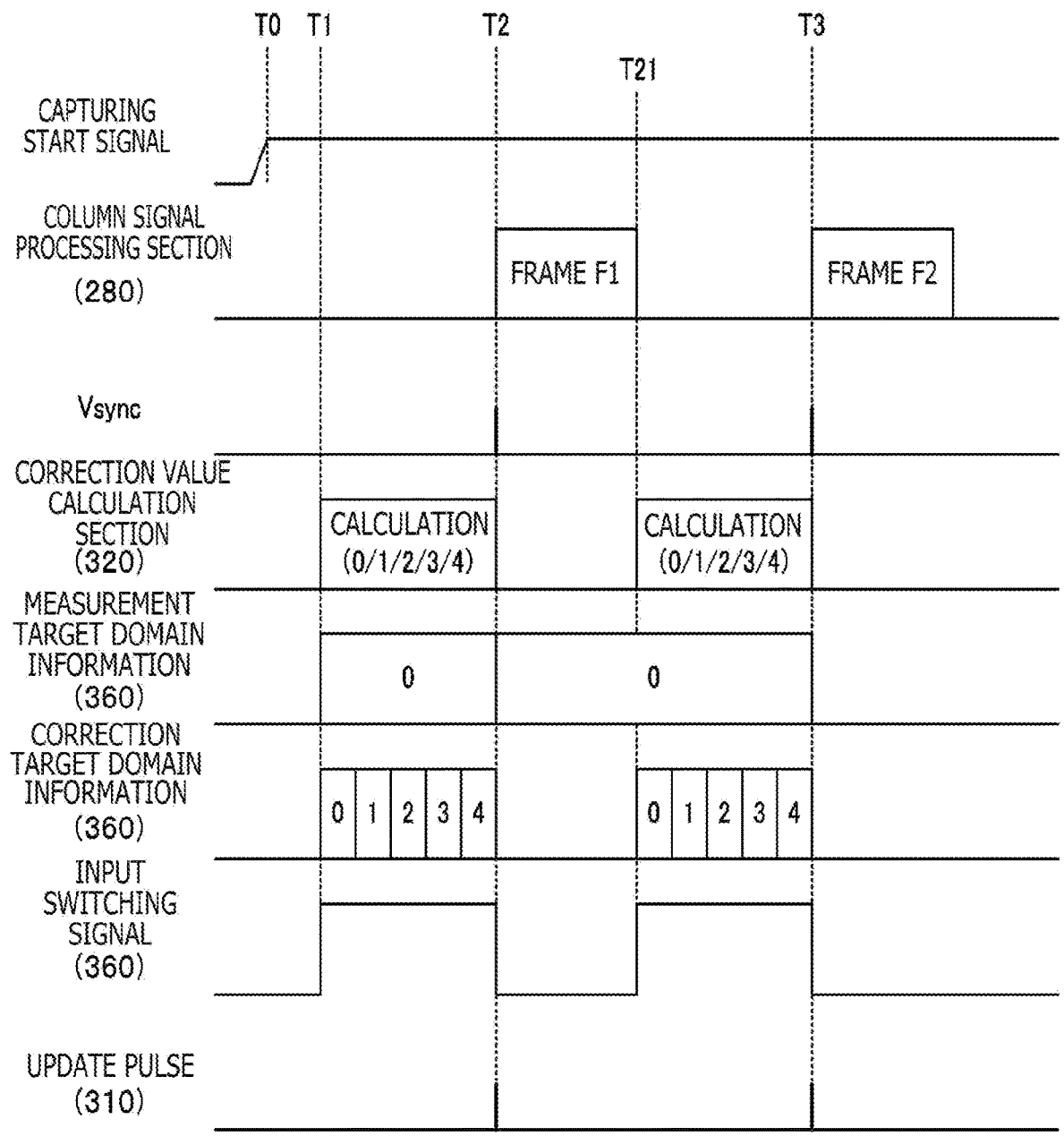

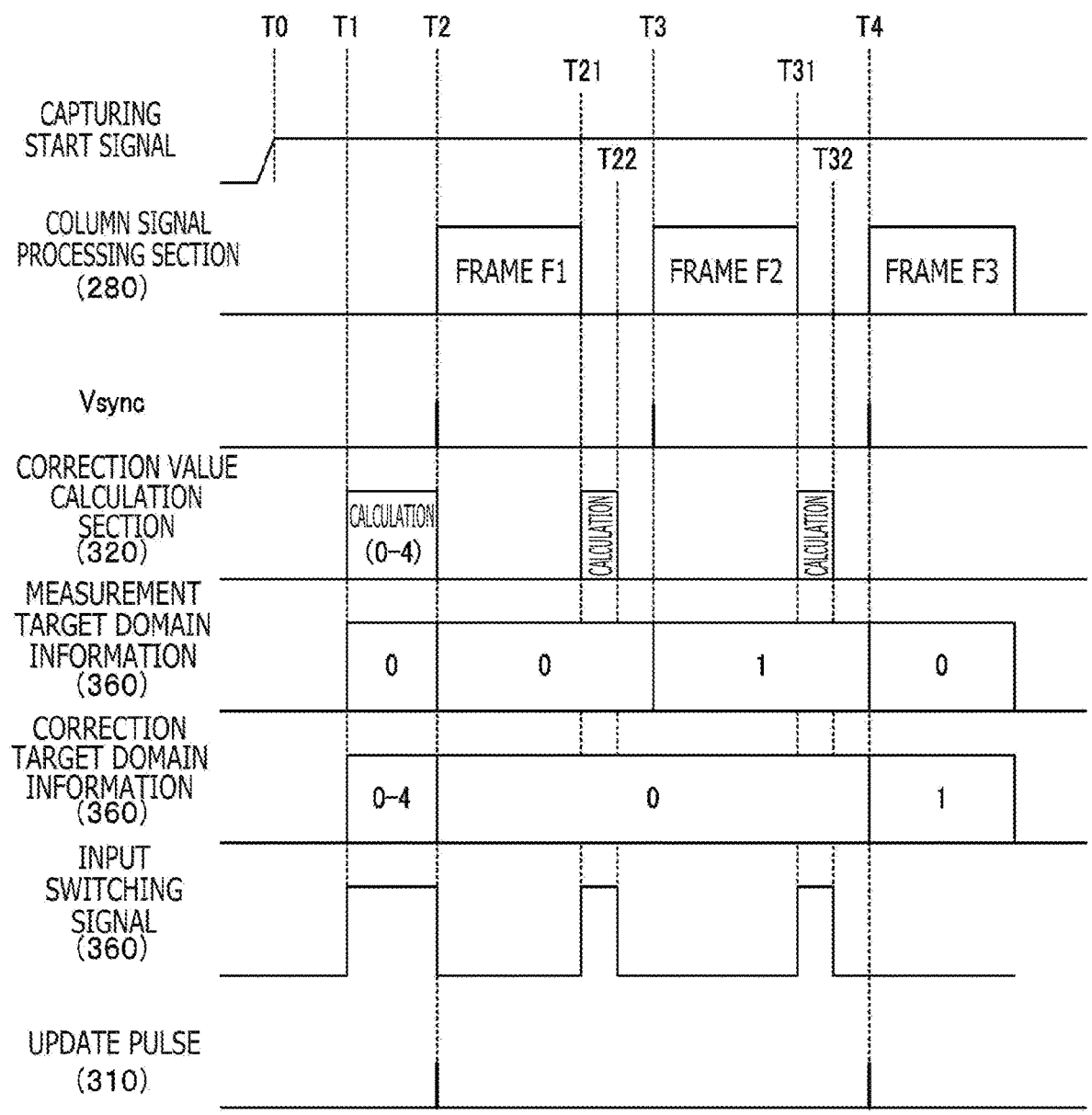

F I G . 2 3
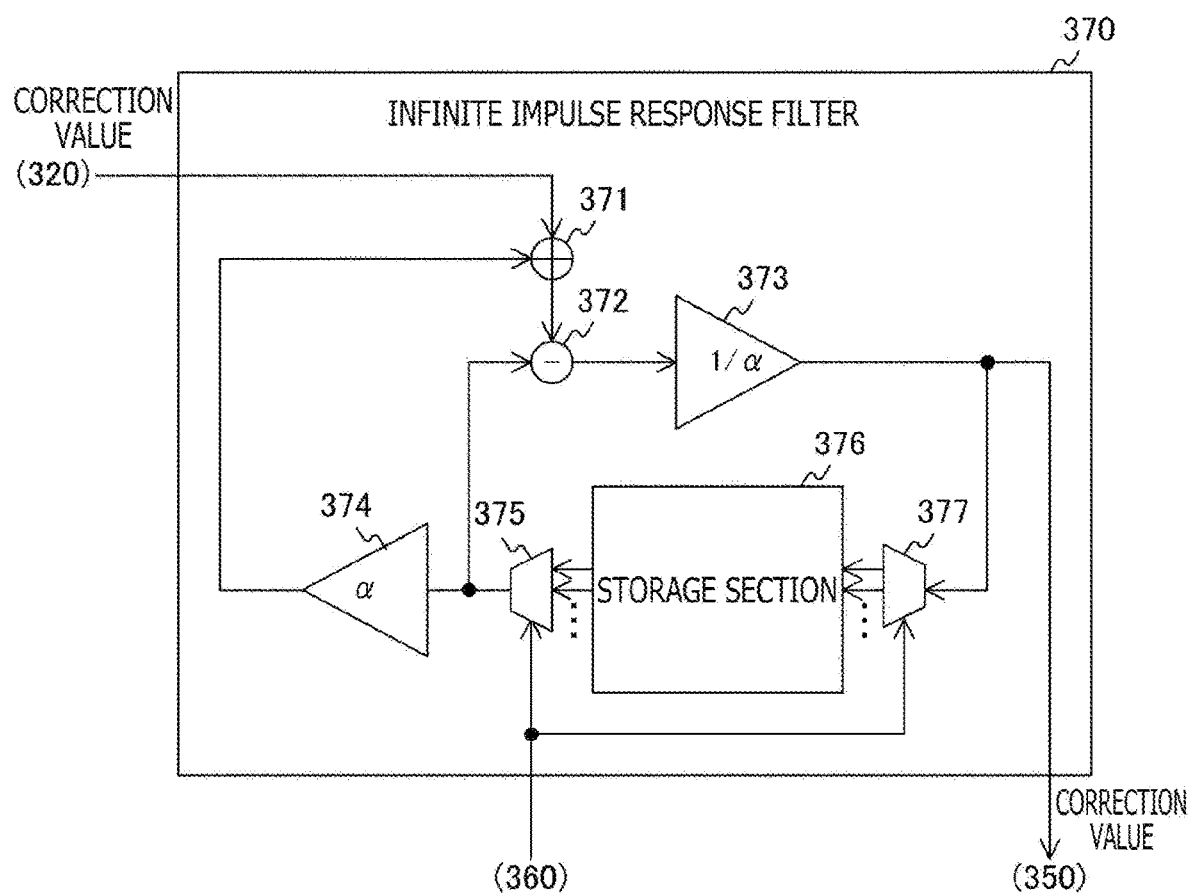

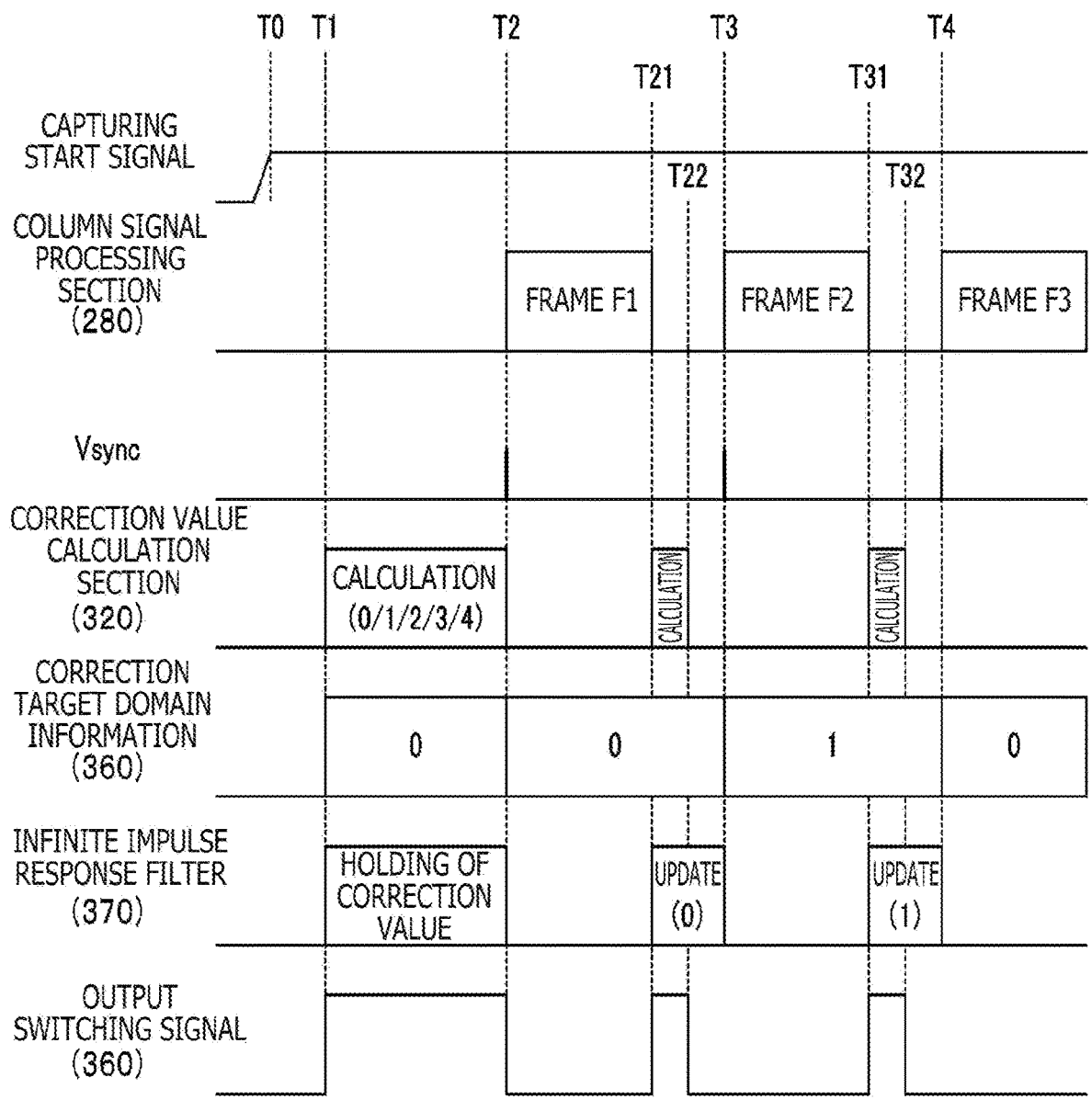

FIG. 29

SOLID-STATE IMAGE CAPTURING ELEMENT, IMAGE CAPTURING APPARATUS, AND METHOD OF CONTROLLING SOLID-STATE IMAGE CAPTURING ELEMENT

CROSS REFERENCE TO RELATED APPLICATIONS

This application is a U.S. National Phase of International Patent Application No. PCT/JP2020/044590 filed on Dec. 1, 2020, which claims priority benefit of Japanese Patent Application No. JP 2019-220810 filed in the Japan Patent Office on Dec. 6, 2019. Each of the above-referenced applications is hereby incorporated herein by reference in its entirety.

TECHNICAL FIELD

The present technology pertains to a solid-state image capturing element. In more detail, the present technology pertains to a solid-state image capturing element, an image capturing apparatus, and a method of controlling the solid-state image capturing element, which are for performing signal processing for each column.

BACKGROUND ART

In the past, a single slope type ADC (Analog to Digital Converter) provided with a comparator and a counter is widely used in a solid-state image capturing element etc., because configuration is easier than with a sequential comparison type ADC etc. For example, there is proposed a solid-state image capturing element for capturing image data in which a single slope type ADC is provided for each column (for example, refer to PTL 1).

CITATION LIST

Patent Literature

[PTL 1]
Japanese Patent Laid-open No. 2009-124513

SUMMARY

Technical Problem

In the conventional technology described above, a single slope type ADC with a simple configuration is used, whereby reduction of circuit scale is achieved in comparison to a case of using a sequential comparison type ADC etc. However, in the solid-state image capturing element described above, there is a risk of fixed pattern noise caused by variation in analog gain with respect to an input signal arising in each ADC for each column. In particular, there is a problem in that, fixed pattern noise having a vertical streak shape is more likely to occur when the power-supply voltage for the comparator is reduced in order to reduce power consumption.

The present technology is made in the light of such a situation, and has an objective of reducing noise in a solid-state image capturing element provided with an ADC for each column.

Solution to Problem

The present technology is made in order to resolve the problem described above, and a first aspect of the present technology is a solid-state image capturing element including an analog-to-digital converter configured to increase or decrease an analog signal using an analog gain selected from among a plurality of analog gains and convert the increased or decreased analog signal to a digital signal, an input switching section configured to input, as the analog signal, one of a test signal having a predetermined level and a pixel signal to the analog-to-digital converter, a correction value calculation section configured to obtain, from the test signal and the digital signal, a correction value for correcting an error in the selected analog gain and output the correction value, and a correction section configured to correct the digital signal using the outputted correction value, and a method of controlling the solid-state image capturing element. As a result, an effect to remove fixed pattern noise is achieved.

In addition, in this first aspect, the analog-to-digital converter may be provided with a comparator configured to compare the analog signal with a predetermined ramp signal and output a comparison result, and a digital signal generation section configured to generate the digital signal on the basis of the comparison result, the comparator may be provided with a differential amplification circuit configured to amplify a difference between a predetermined reference voltage and a voltage of a predetermined node and output the amplified difference as the comparison result, a vertical signal line side capacitor inserted between the predetermined node and the input switching section, a ramp side capacitor inserted between the predetermined node and a digital-to-analog converter that generates the ramp signal, and a switch configured to change a capacitance ratio between the vertical signal line side capacitor and the ramp side capacitor according to a predetermined control signal, and the plurality of analog gains may be classified into a plurality of gain domains for which the capacitance ratio is mutually different. As a result, an effect to control a capacitance ratio is achieved.

In addition, in this first aspect, it is possible to further include a controller configured to cause one gain domain from among the plurality of gain domains to be selected according to the control signal. As a result, an effect to control gain domains is achieved.

In addition, in this first aspect, the controller may perform activation-time processing for causing each of the plurality of gain domains to be selected before a video time period in which the pixel signal is generated, and perform, in a vertical blanking time period in which the test signal is inputted, division processing for causing the gain domain to be changed in a predetermined order each time a predetermined number of frames are generated, and the number of the digital signals which are in the activation-time processing and which respectively correspond to the plurality of gain domains is the same as the number of digital signals in the division processing. As a result, an effect to perform calibration, using the same number of samples as those in division processing, at a time of activation processing is achieved.

In addition, in this first aspect, the controller may perform activation-time processing for causing each of the plurality of gain domains to be selected before a video time period in which the pixel signal is generated, and perform, in a vertical blanking time period in which the test signal is inputted, division processing for causing the gain domain to be changed in a predetermined order each time a predetermined number of frames are generated, and the number of the digital signals which are in the activation-time processing and which respectively correspond to the plurality of gain domains is less than the number of digital signals in the division processing. As a result, an effect to perform calibration, using a fewer number of samples than those in division processing, at a time of activation processing is achieved.

In addition, in the first aspect, a filter configured to gradually change a response to the outputted correction value may be further included, and the controller, in a vertical blanking time period in which the test signal is generated, may perform division processing for causing a gain domain set in a video time period in which the pixel signal is generated to be selected. As a result, an effect to perform correction using a correction value that has passed through the filter is achieved.

In addition, in the first aspect, the controller may further perform, before the video time period, activation-time processing for causing a predetermined reference domain from among the plurality of gain domains and a gain domain which is to be set in the video time period to be selected. As a result, an effect to shorten an amount of time for activation-time processing is achieved.

In addition, in this first aspect, the controller, before the video time period, may further perform activation-time processing for causing each of the plurality of gain domains to be selected in order according to the control signal. As a result, an effect to calculate a correction value for all gain domains at a time of activation is achieved.

In addition, in the first aspect, the controller, in the vertical blanking time period, may cause the set gain domain and the reference domain to be selected in order. As a result, an effect to improve correction accuracy is achieved.

In addition, a second aspect of the present technology is an image capturing apparatus including a pixel array section in which a plurality of pixels, each generating a pixel signal, is arrayed, an analog-to-digital converter configured to increase or decrease an analog signal using an analog gain selected from among a plurality of analog gains, and convert the increased or decreased analog signal to a digital signal, an input signal switching section configured to input, as the analog signal, one of a test signal having a predetermined level and the pixel signal to the analog-to-digital converter, a correction value calculation section configured to obtain, from the test signal and the digital signal, a correction value for correcting an error in the selected analog gain and output the correction value, and a correction section configured to correct the digital signal using the outputted correction value. As a result, an effect to remove fixed pattern noise in image data captured by an image capturing apparatus is achieved.

BRIEF DESCRIPTION OF DRAWINGS

FIG. 14 is a timing chart illustrating an example of operation by a solid-state image capturing element in a time period until generation of a sixth frame, in the first embodiment of the present technology.

FIG. 16 is a timing chart illustrating an example of operation by a solid-state image capturing element in a comparative example.

FIG. 21 is a timing chart illustrating an example of operation by a solid-state image capturing element in the second embodiment of the present technology.

FIG. 23 is a block diagram illustrating an example of a configuration of an infinite impulse response filter in the third embodiment of the present technology.

FIG. 25 is a timing chart illustrating an example of operation by a solid-state image capturing element in a time period until generation of a third frame, in the third embodiment of the present technology.

FIG. 29 is a timing chart illustrating an example of operation by a solid-state image capturing element in a time period until generation of a sixth frame, in the fifth embodiment of the present technology.

DESCRIPTION OF EMBODIMENTS

Description is given below regarding aspects (referred to below as embodiments) for implementing the present technology. The description is given in the following order.

1. First embodiment (example in which division processing is performed)
2. Second embodiment (example of reducing number of samples at activation time and performing division processing)
3. Third embodiment (example in which division processing is performed and an infinite impulse response filter is provided)
4. Fourth embodiment (example of reducing gain domains at activation time and performing division processing)
5. Fifth embodiment (example of also performing calculation regarding reference gain domain in division processing)
6. Example of application to mobile body

1. First Embodiment

[Example of Configuration of Image Capturing Apparatus]

Figure 1:
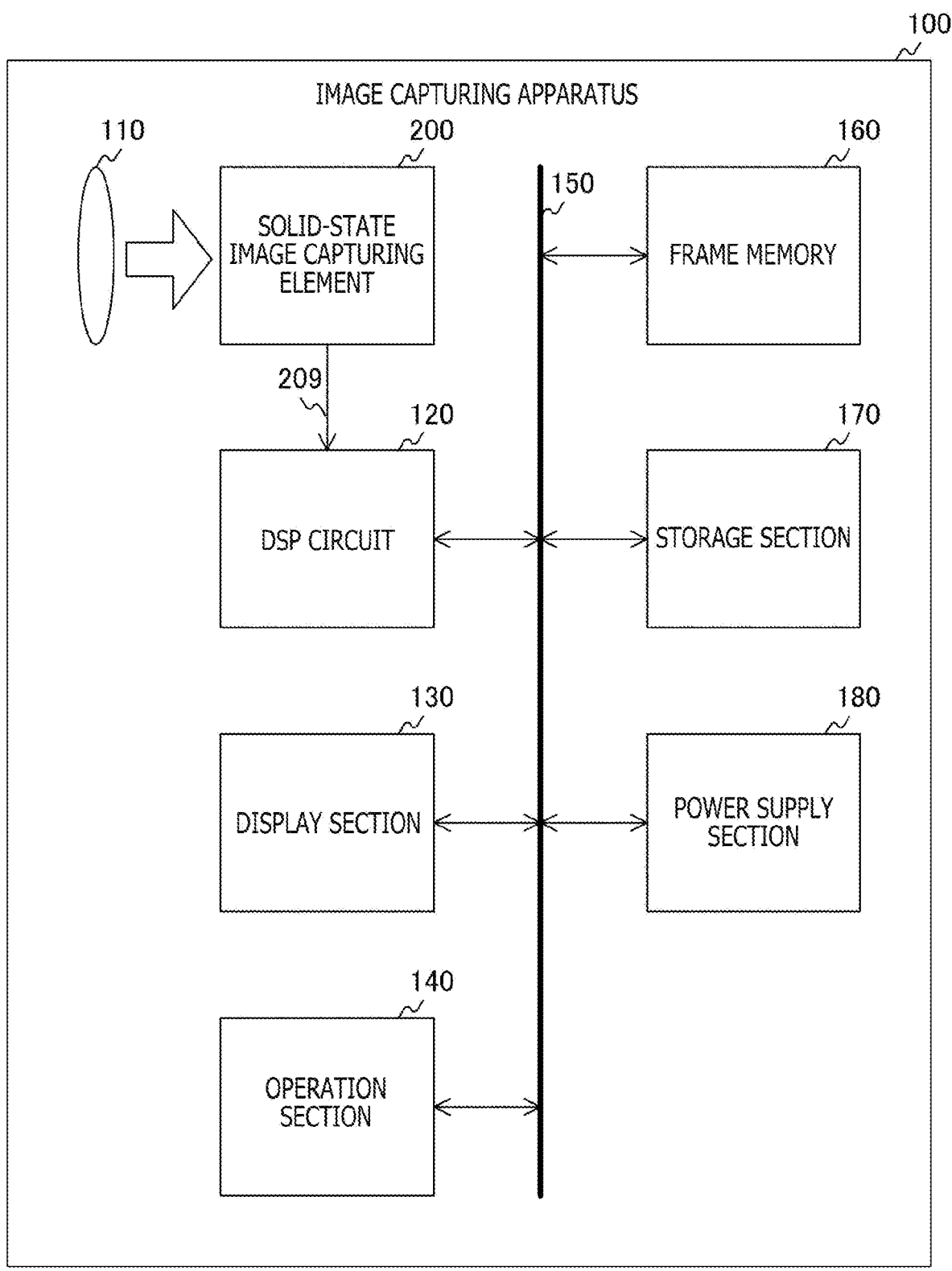
FIG. 1 is a block diagram illustrating an example of a configuration of an image capturing apparatus in a first embodiment of the present technology.

FIG. 1 is a block diagram illustrating an example of a configuration of an image capturing apparatus 100 in a first embodiment of the present technology. This image capturing apparatus 100 is an apparatus for capturing image data (frames) and includes an optical section 110, a solid-state image capturing element 200, and a DSP (Digital Signal Processing) circuit 120. The image capturing apparatus 100 further includes a display section 130, an operation section 140, a bus 150, a frame memory 160, a storage section 170, and a power supply section 180. Envisioned as the image capturing apparatus 100 is, for example, a digital camera such as a digital still camera, as well as a smartphone or a personal computer which has an image capturing function, an in-vehicle camera, etc.

The optical section 110 condenses light from a photographic subject, and guides the light to the solid-state image capturing element 200. The solid-state image capturing element 200 generates a frame by photoelectric conversion, in synchronization with a vertical sync signal. Here, the vertical sync signal is a periodic signal having a predetermined frequency and indicating a timing for image capturing. The solid-state image capturing element 200 supplies generated image data to a DSP circuit 120 via a signal line 209.

The DSP circuit 120 executes predetermined signal processing on the frame from the solid-state image capturing element 200. This DSP circuit 120 outputs a processed frame to the frame memory 160 etc., via the bus 150.

The display section 130 displays a frame. A liquid crystal panel or an organic EL (Electro Luminescence) panel, for example, is envisioned as the display section 130. The operation section 140 generates an operation signal according to an operation by a user.

The bus 150 is a shared path for the optical section 110, the solid-state image capturing element 200, the DSP circuit 120, the display section 130, the operation section 140, the frame memory 160, the storage section 170, and the power supply section 180 to exchange data with each other.

The frame memory 160 holds image data. The storage section 170 stores various kinds of data such as a frame. The power supply section 180 supplies power to the solid-state image capturing element 200, the DSP circuit 120, the display section 130, etc.

[Example of Configuration of Solid-State Image Capturing Element]

Figure 2:
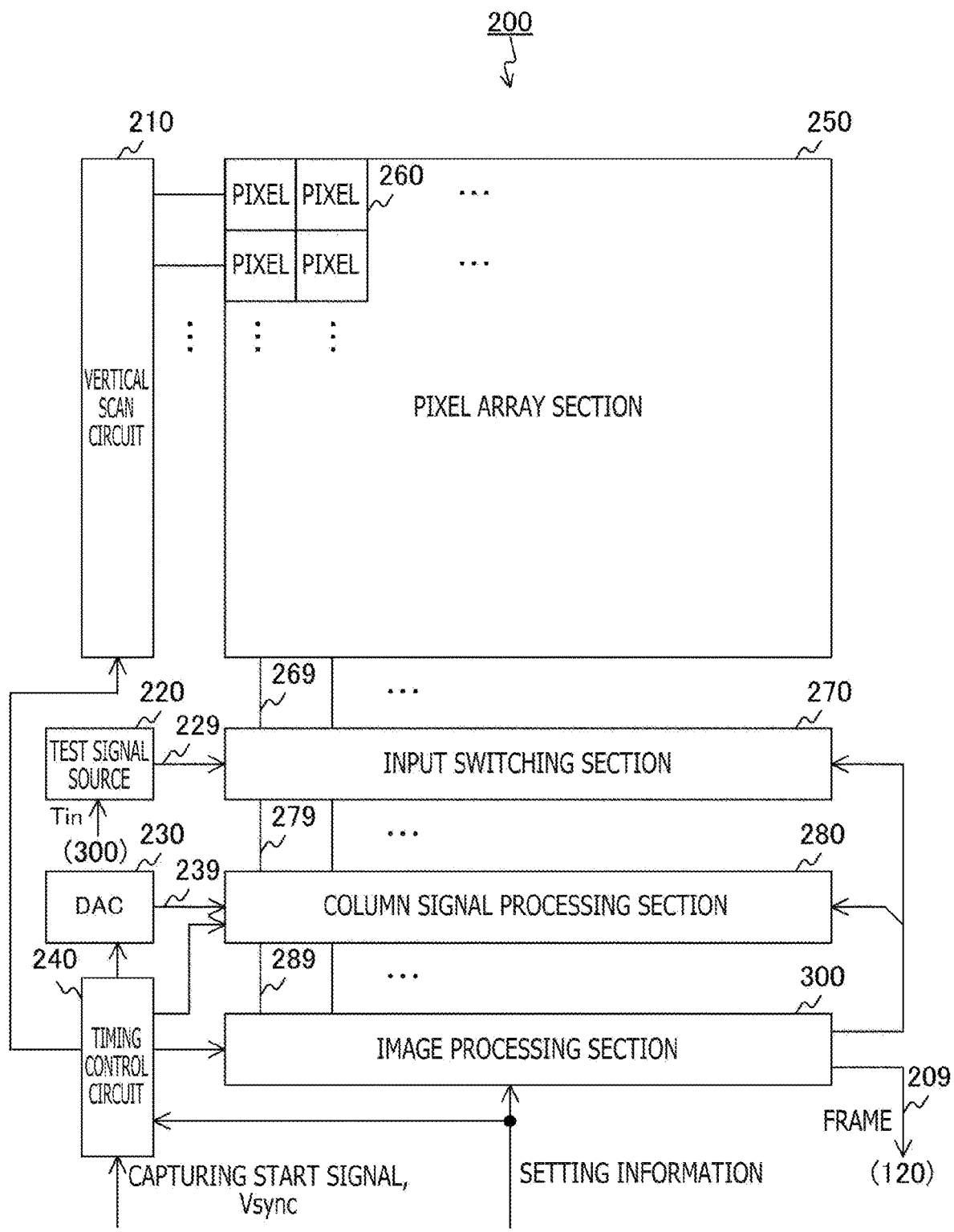
FIG. 2 is a block diagram illustrating an example of a configuration of a solid-state image capturing element in the first embodiment of the present technology.

FIG. 2 is a block diagram illustrating an example of a configuration of the solid-state image capturing element 200 in the first embodiment of the present technology. The solid-state image capturing element 200 includes a vertical scan circuit 210, a test signal source 220, a DAC 230, a timing control circuit 240, a pixel array section 250, an input switching section 270, a column signal processing section 280, and an image processing section 300.

A plurality of pixels 260 are arrayed in a two-dimensional grid in a pixel array section 250. Below, a set of pixels 260 arrayed in a predetermined horizontal direction is referred to as a "row," and a set of pixels 260 arrayed in a direction orthogonal to the horizontal direction is referred to as a "column" or a "column."

The timing control circuit 240 controls operation timings for the vertical scan circuit 210, the DAC 230, and the column signal processing section 280 in synchronization with a vertical sync signal Vsync. In addition, a capturing start signal for instructing the start of capturing of a moving image including a plurality of consecutive frames is inputted to the timing control circuit 240. The capturing start signal is generated by an external host computer (not illustrated), for example.

The vertical scan circuit 210 selects and drives rows in order, and causes an analog pixel signal to be outputted to the input switching section 270.

The pixels 260, under control by the vertical scan circuit 210, generate pixel signals by photoelectric conversion. Each pixel 260 outputs the pixel signal to the column signal processing section 280 via a vertical signal line 269.

The test signal source 220, according to a control signal Tin from the image processing section 300, generates a signal with a predetermined level as a test signal, and supplies the test signal to the input switching section 270 via a signal line 229. For example, a DAC which is for correction and is provided separately from the DAC 230 is used as the test signal source 220.

The input switching section 270, under control by the image processing section 300, selects, for each column, one of a pixel signal and a test signal for the column. This input switching section 270 supplies the selected signal to the column signal processing section 280 as an input signal.

The DAC 230 generates a reference signal by DA (Digital to Analog) conversion, and supplies the reference signal to the column signal processing section 280. For example, a sawtooth pattern ramp signal is used as the reference signal.

The column signal processing section 280 uses the reference signal to, for each column, convert an analog input signal to a digital signal. This column signal processing section 280 supplies the digital signal to the image processing section 300.

The image processing section 300 performs predetermined image processing on a frame in which digital signals are arrayed. This image processing includes correction processing for reducing fixed pattern noise. The image processing section 300 supplies a processed frame to the DSP circuit 120.

In addition, setting information from the outside is inputted to the timing control circuit 240 and the image processing section 300. This setting information, for example, indicates a setting value such as an analog gain during capturing, and is generated by a host computer etc.

[Example of Configuration of Pixel]

Figure 3:
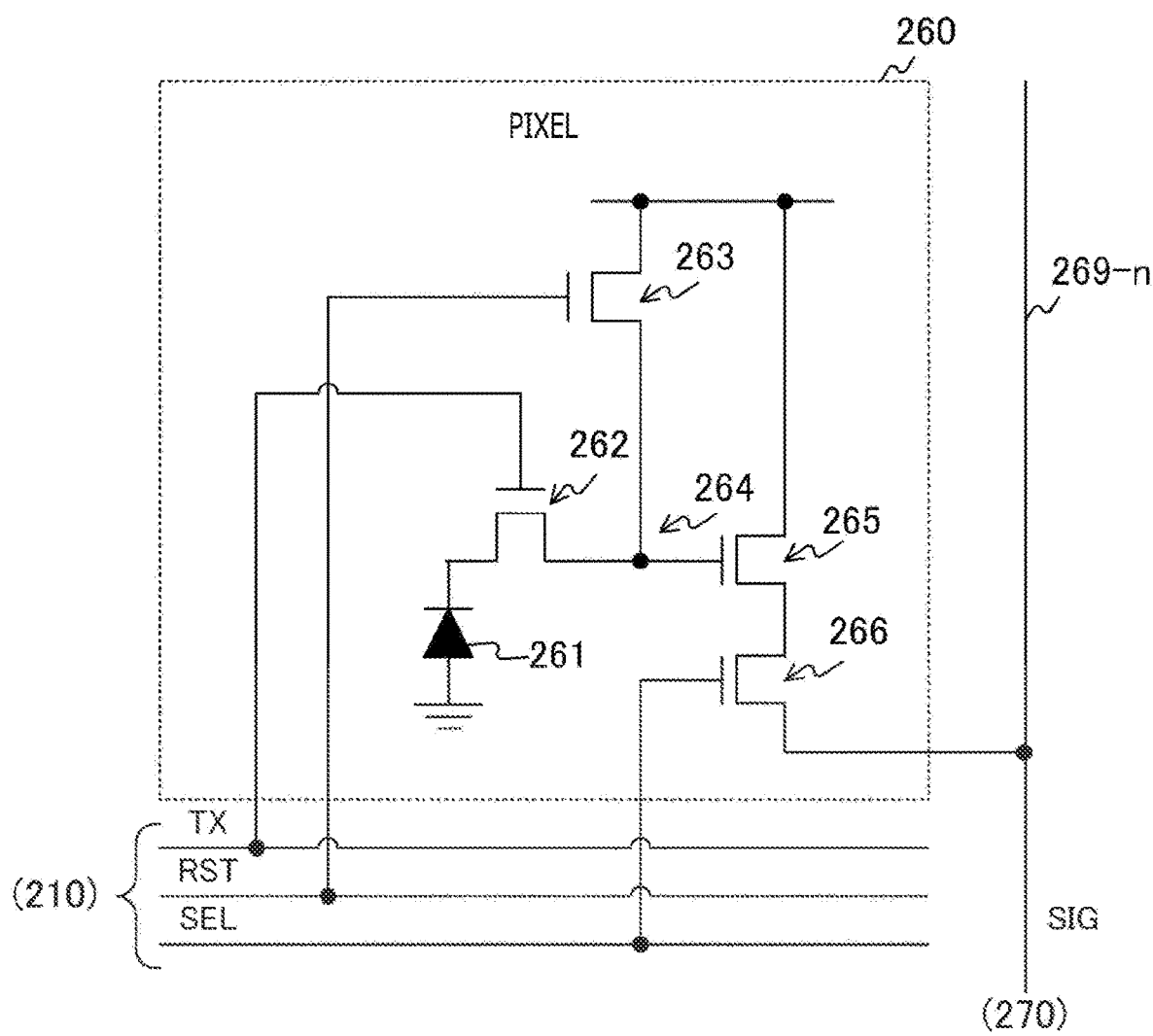
FIG. 3 is a circuit diagram illustrating an example of a configuration of a pixel in the first embodiment of the present technology.

FIG. 3 is a circuit diagram illustrating an example of a configuration of the pixel 260 in the first embodiment of the present technology. The pixel 260 includes a photoelectric conversion element 261, a transfer transistor 262, a reset transistor 263, a floating diffusion layer 264, an amplifying transistor 265, and a selection transistor 266.

The photoelectric conversion element 261 generates charge by photoelectrically converting incident light. The transfer transistor 262 transfers charge from the photoelectric conversion element 261 to the floating diffusion layer 264 according to a transfer signal TX from the vertical scan circuit 210. The reset transistor 263, according to a reset signal RST from the vertical scan circuit 210, initializes an amount of charge in the floating diffusion layer 264.

The floating diffusion layer 264 accumulates charge and generates a voltage which corresponds to an amount of charge. The amplifying transistor 265 amplifies the voltage from the floating diffusion layer 264. The selection transistor 266, according to a selection signal SEL from the vertical scan circuit 210, outputs an amplified voltage signal as a pixel signal SIG. Letting the number of columns be N (N is an integer), a pixel signal from an n-th (n is an integer from 1 through N) column is transmitted to the input switching section 270 via a vertical signal line 269-*n*.

Note that a circuit for the pixel 260 is not limited to that exemplified in FIG. 3 if the circuit can generate a pixel signal by photoelectric conversion.

[Example of Configuration of Input Switching Section]

Figure 4:
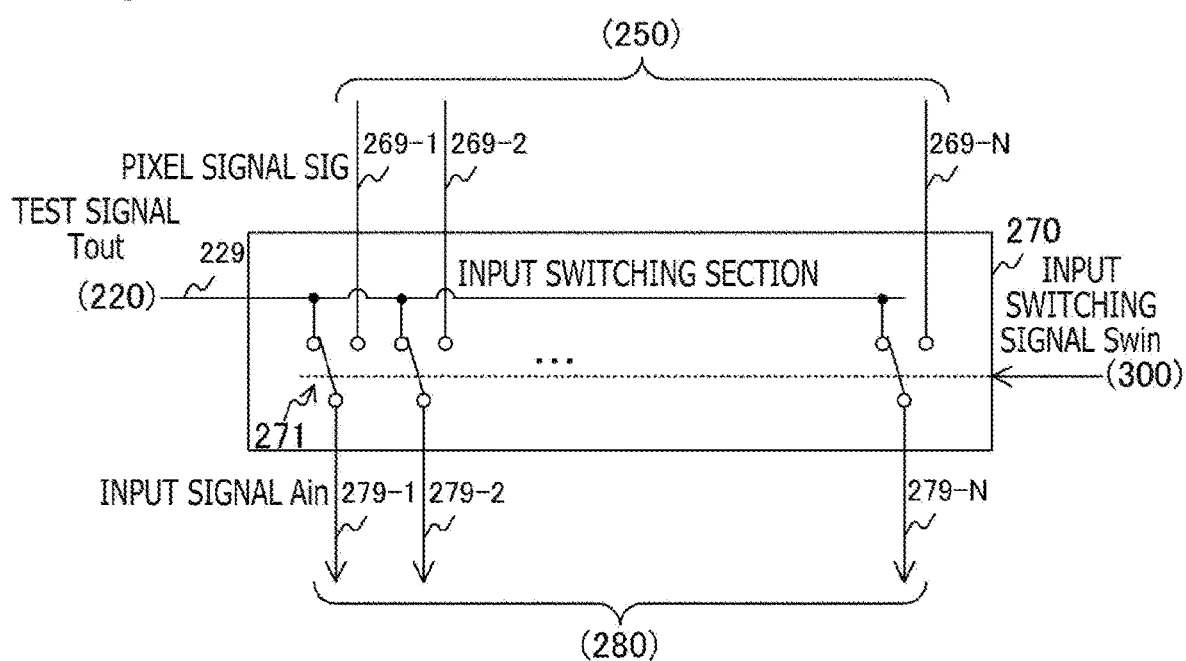
FIG. 4 is a circuit diagram illustrating an example of a configuration of an input switching section in the first embodiment of the present technology.

FIG. 4 is a circuit diagram illustrating an example of a configuration of the input switching section 270 in the first embodiment of the present technology. This input switching section 270 is provided with a plurality of selectors 271. A selector 271 is provided for each column. N selectors 271 are arrayed in a case where the number of columns is N.

The selector 271, according to an input switching signal SWin from the image processing section 300, selects one a pixel signal SIG for a corresponding column and a test signal Tout from the test signal source 220. One of two input terminals belonging to a selector 271 for the n-th column is connected to the pixel array section 250 via the vertical signal line 269-*n*, and the other is connected to the test signal source 220 via the signal line 229. In addition, an output terminal belonging to the selector 271 for the n-th column is connected to the column signal processing section 280 via a signal line 279-*n*. The selector 271 outputs a selected signal as an input signal Ain.

[Example of Configuration of Column Signal Processing Section]

Figure 5:
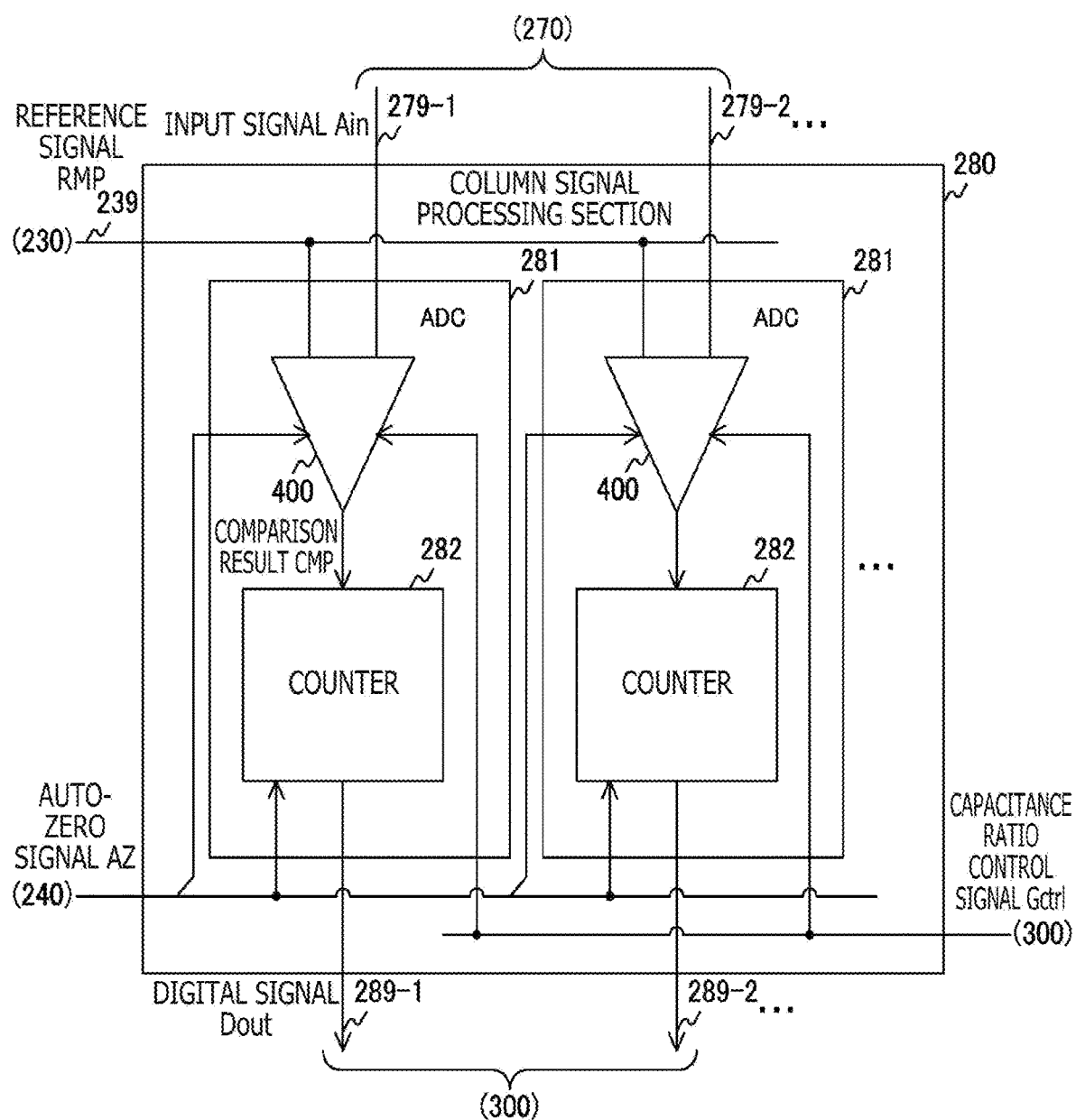
FIG. 5 is a block diagram illustrating an example of a configuration of a column signal processing section in the first embodiment of the present technology.

FIG. 5 is a block diagram illustrating an example of a configuration of the column signal processing section 280 in the first embodiment of the present technology. This column signal processing section 280 is provided with a plurality of ADCs 281. An ADC 281 is provided for each column. N ADCs 281 are arrayed in a case where the number of columns is N.

The ADC 281 converts an analog input signal Ain for a corresponding column to a digital signal Dout. This ADC 281 includes a comparator 400 and a counter 282.

The comparator 400 compares a reference signal RMP with an input signal Ain for a corresponding column. This comparator 400 supplies a comparison result CMP to the counter 282. In addition, an auto-zero signal AZ from the timing control circuit 240 and a capacitance ratio control signal Gctrl from the image processing section 300 are inputted to the comparator 400. Here, a gain control signal Gctrl is for controlling an analog gain for the ADC 281 by switching a capacitance ratio.

The counter 282, under control by the timing control circuit 240, counts a counted value over a time period until the comparison result CMP inverts. The counter 282 supplies a signal indicating the counted value to the image processing section 300 as a digital signal Dout. Note that the counter 282 is an example of a digital signal generation section set forth in the claims.

As exemplified in FIG. 5, the ADC 281 which performs an AD conversion using the comparator 400 and the counter 282 is referred to as a single slope type ADC.

Note that it is possible to dispose, as the ADC 281, an ADC which is not a single slope type and is a sequential comparison type etc., if the ADC performs an AD conversion using the comparator 400. In a case of disposing a sequential comparison type ADC, an SAR (Successive Approximation Register) logic circuit and a register are disposed in place of the counter 282. This SAR logic circuit, on the basis of the comparison result CMP, obtains a value of a reference signal that is approximate to an input signal, and generates a DAC control signal for updating the reference signal to be the value. The register holds a digital signal in which comparison results are arrayed and a DAC control signal, and outputs the digital signal to the image processing section 300 while outputting the DAC control signal to the DAC 230.

[Example of Configuration of Comparator]

Figure 6:
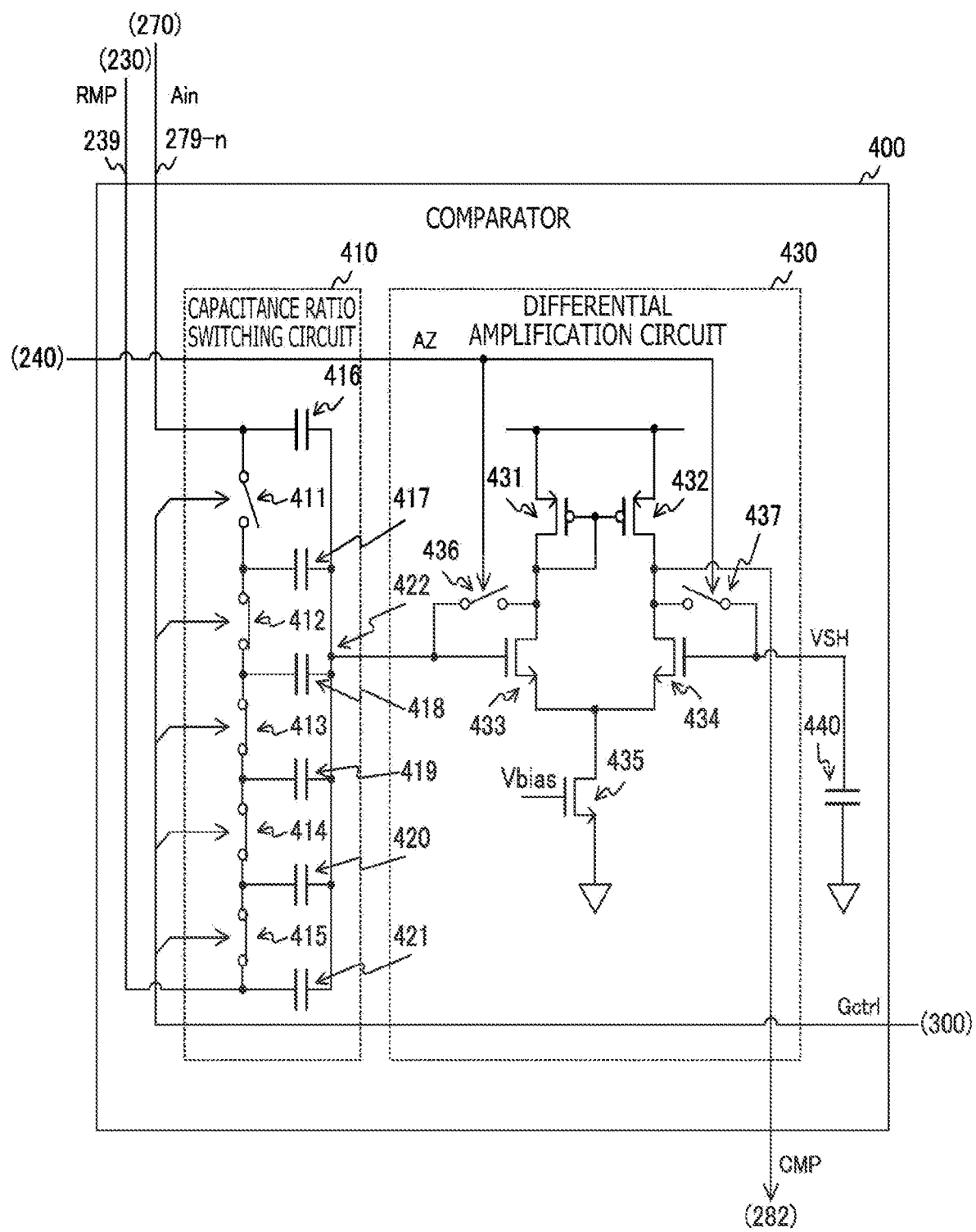
FIG. 6 is a circuit diagram illustrating an example of a configuration of a comparator in the first embodiment of the present technology.

FIG. 6 is a circuit diagram illustrating an example of a configuration of the comparator 400 in the first embodiment of the present technology. A capacitance ratio switching circuit 410 and a differential amplification circuit 430 are disposed in this comparator 400. The capacitance ratio switching circuit 410 includes a predetermined number of switches such as switches 411 through 415, and a plurality of capacitors such as capacitors 416 through 421.

One end of each of the capacitors 416 through 421 is connected in common to a node 422. The other end of the capacitor 416 is connected to the input switching section 270 via the signal line 279-*n*, and the other end of the capacitor 421 is connected to the DAC 230 via the signal line 239.

The switch 411 opens and closes a route between the other end of the capacitor 416 and the other end of the capacitor 417, according to the capacitance ratio control signal Gctrl. The switch 412 opens and closes a route between the other end of the capacitor 417 and the other end of the capacitor 418, according to the capacitance ratio control signal Gctrl. The switch 413 opens and closes a route between the other end of the capacitor 418 and the other end of the capacitor 419, according to the capacitance ratio control signal Gctrl. The switch 414 opens and closes a route between the other end of the capacitor 419 and the other end of the capacitor 420, according to the capacitance ratio control signal Gctrl. The switch 415 opens and closes a route between the other end of the capacitor 420 and the other end of the capacitor 421, according to the capacitance ratio control signal Gctrl.

The image processing section 300 performs control, using the capacitance ratio control signal Gctrl, to set only one of the switches 411 through 415 to an open state and set the remainder to a closed state. As a result of this control, the capacitance ratio between a composite capacitor for the capacitors inserted between the signal line 279-*n* on the vertical signal line side and the node 422 and a composite capacitor for capacitors inserted between the signal line 239 on the ramp signal side and the node 422 is changed. Hereinafter, the composite capacitor on the vertical signal line side is referred to as "VSL side capacitor," and the composite capacitor on the ramp signal side is referred to as "ramp side capacitor." In FIG. 6, the image processing section 300 can switch the capacitance ratio in five stages by controlling the five switches.

Note that, although five stages are given for the capacitance ratio, it is possible for the image processing section 300 to switch the capacitance ratio in a plurality of stages apart from five stages. When the number of stages is M (M is an integer), M switches and M+1 capacitors are disposed in the capacitance ratio switching circuit 410.

In addition, the capacitance of the capacitor 416 is set to be the highest, and the respective capacitances of the capacitors 417 through 421 are set to be the same. Note that it is possible to set the capacitance of each of the capacitors 416 through 421 to an optionally defined value.

A capacitor 440 holds a predetermined reference voltage VSH.

The differential amplification circuit 430 amplifies the difference between the voltage at the node 422 and the reference voltage VSH. The differential amplification circuit 430 includes pMOS transistors 431 and 432, auto-zero switches 436 and 437, and nMOS transistors 433 through 435.

The pMOS transistors 431 and 432 are connected in parallel to a power supply. The gate of the pMOS transistor 431 is connected to its own drain and the gate of the pMOS transistor 432.

The drain of the nMOS transistor 433 is connected to the pMOS transistor 431, and the source is connected to a common node. In addition, the gate of the nMOS transistor 433 is connected to the node 422. The drain of the nMOS transistor 434 is connected to the pMOS transistor 432, and the source is connected to the common node. In addition, the gate of the nMOS transistor 434 is connected to the capacitor 440.

The nMOS transistor 435 is inserted between the common node and a ground terminal, with a predetermined bias voltage Vbias inputted to the gate thereof.

The auto-zero switch 436 short-circuits between the drain and the gate of the nMOS transistor 433 according to an auto-zero signal AZ from the timing control circuit 240. The auto-zero switch 437 short-circuits between the drain and the gate of the nMOS transistor 434 according to the auto-zero signal AZ.

In addition, a comparison result CMP is outputted to the counter 282 from a connection point between the pMOS transistor 432 and the nMOS transistor 434.

During an AD conversion time period, a ramp signal for which a level thereof increases as time elapses is inputted as a reference signal RMP to the comparator 400 having the configuration exemplified in FIG. 6.

Figure 7:
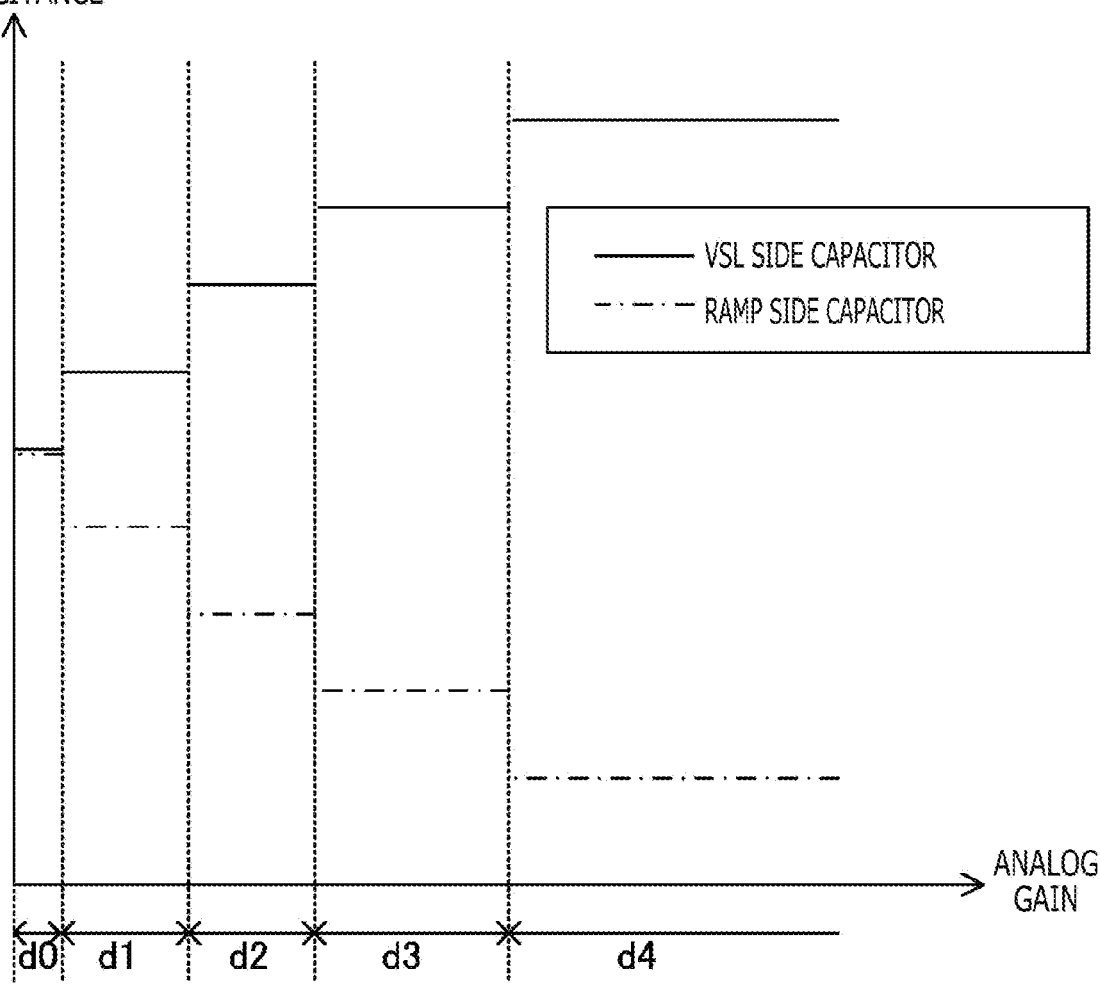
FIG. 7 is a view illustrating an example of a VSL (Vertical Signal Line) side capacitor and a ramp side capacitor for each gain domain in the first embodiment of the present technology.

FIG. 7 is a view illustrating an example of a VSL side capacitor and a ramp side capacitor for each gain domain in the first embodiment of the present technology.

Here, the analog gain of the ADC 281 can be controlled according to the inclination of the slope of the reference signal RMP (a ramp signal) and the capacitance ratio between the VSL side capacitor and the ramp side capacitor. The gentler the inclination of the slope is made, the higher the analog gain becomes. In addition, the analog gain increases or decreases according to the capacitance ratio. In a case where the inclination of the slope is controlled in K (K is an integer) stages and the capacitance ratio is controlled in M stages, it is possible to realize an analog gain in K×M stages. These K×M analog gains are classified into M groups having mutually different capacitance ratios, and these groups are referred to below as "gain domains." For example, in a case where the capacitance ratio can be switched in five stages, it is possible to classify the analog gain into five gain domains d0 through d4. In each gain domain, the capacitance ratio is set to be the same, and the analog gain is controlled in a plurality of stages according to the inclination of the slope. The host computer, for example, measures an amount of ambient light, and lowers the analog gain, the higher the amount of light.

The vertical axis in FIG. 7 indicates the VSL side capacitor or the ramp side capacitor, and the horizontal axis indicates an analog gain. In the gain domain d0, the VSL side capacitor is the same as the ramp side capacitor. In the gain domains d1 through d4, the VSL side capacitor is greater than the ramp side capacitor. The higher the VSL side capacitor becomes, the greater the analog gain becomes.

[Example of Configuration of Image Processing Section]

Figure 8:
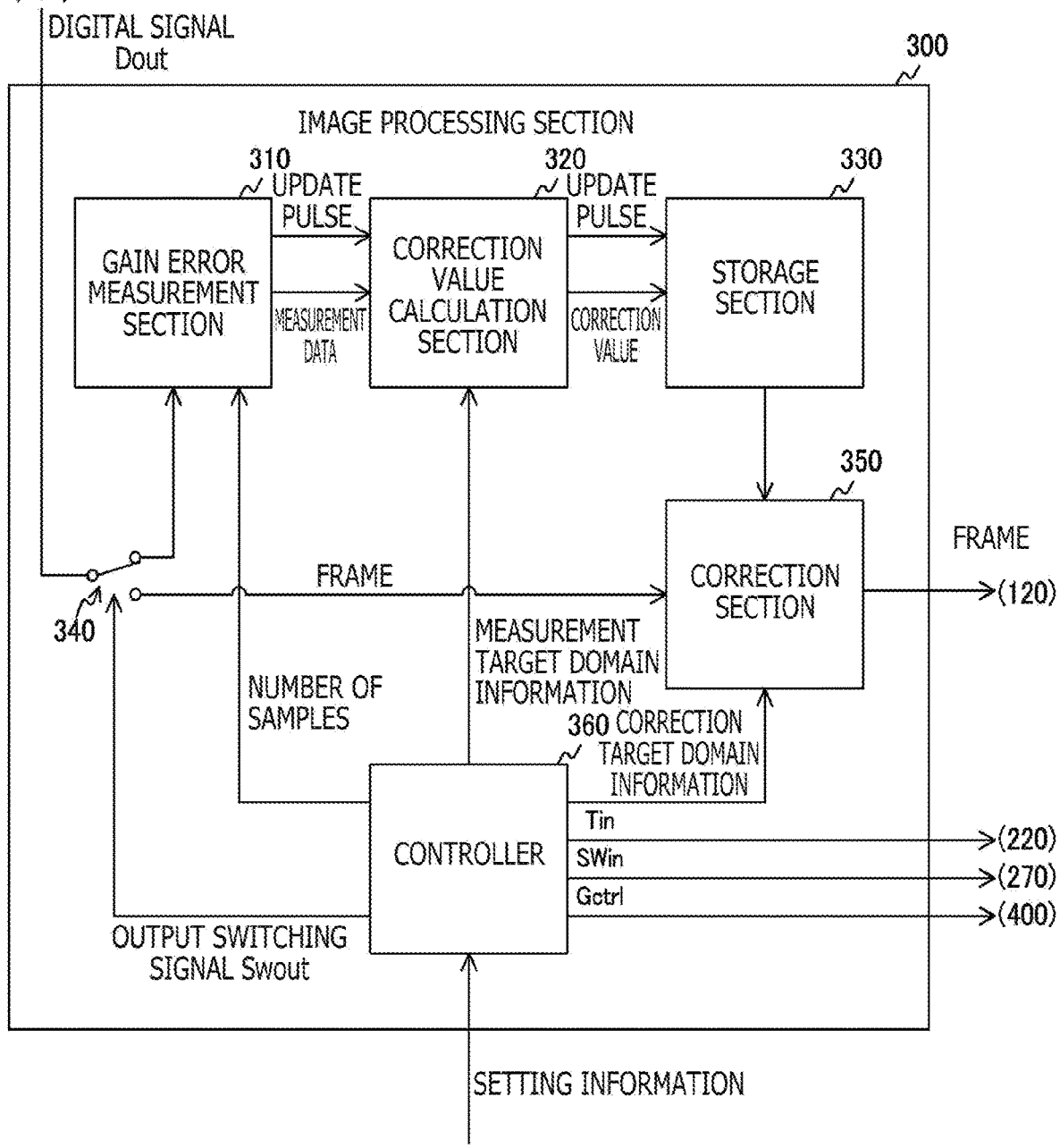
FIG. 8 is a block diagram illustrating an example of a configuration of an image processing section in the first embodiment of the present technology.

FIG. 8 is a block diagram illustrating an example of a configuration of the image processing section 300 in the first embodiment of the present technology. The image processing section 300 includes a gain error measurement section 310, a correction value calculation section 320, a storage section 330, a selector 340, a correction section 350, and a controller 360.

The selector 340 outputs the digital signal Dout from the column signal processing section 280 to one of the gain error measurement section 310 and the correction section 350, according to an output switching signal SWout from the controller 360.

The gain error measurement section 310 measures a parameter representing an error in analog gain, from the digital signal from the selector 340. Here, in a case where the ADC 281 is provided for each column, an error may arise in the analog gain for each ADC 281, and the error often differs for each column. There is a risk of fixed pattern noise arising due to a relative gain error between columns. An error in analog gain arises due to, for example, product variation between analog circuits in the comparator 400 or deterioration over time. Accordingly, in order to align the analog gains, the gain error measurement section 310 measures a luminance level error over a plurality of times for each column and each gain domain, and obtains a relative gain error between columns on the basis of these measurements. The number of AD conversions for obtaining an analog gain is set as the number of samples according to setting information from the host computer. Then, the gain error measurement section 310 supplies the obtained error to the correction value calculation section 320 as measurement data.

In addition, the gain error measurement section 310 generates an update pulse on the basis of the number of samples from the controller 360, and supplies the update pulse to the correction value calculation section 320 together with the measurement data. This update pulse is a signal for indicating an update timing for a correction value.

The correction value calculation section 320, on the basis of the measurement data, obtains a correction value for correcting an error in analog gain for each column and each gain domain. Here, the correction value includes a value for a gain correction coefficient "a" for correcting the error in analog gain and a value for an offset correction coefficient "b" for correcting an offset error. In a case where the number of columns is N and the number of gain domains is M, N×M×2 correction values are obtained.

The correction value calculation section 320 stores the obtained correction value (the gain correction coefficient and the offset correction coefficient) in the storage section 330. In addition, the correction value calculation section 320 is inputted with measurement target domain information, which indicates a measurement target gain domain for the gain error measurement section 310. The correction value calculation section 320, in synchronization with the update pulse, updates the correction value for the gain domain indicated by the measurement target domain information.

The storage section 330 stores a correction value for each column and each gain domain.

The correction section 350 uses the correction value to correct the digital signal from the selector 340. The controller 360 inputs the correction target domain information, which indicates the correction target gain domain, to the correction section 350. In a case where the digital signal Dout for the n-th column is inputted and the correction target domain information indicates m (m is an integer from 0 through M−1), the correction section 350 reads out the gain correction coefficient a and the offset correction coefficient "b" for the m-th gain domain in the n-th column from the storage section 330. The digital signal Dout is then corrected using the following formula.

$$Dout'=Dout \times a + b \quad \text{Formula 1}$$

In the above formula, Dout' indicates a corrected digital signal.

The correction section 350 supplies the DSP circuit 120 with image data (frame) in which digital signals Dout' obtained using formula 1 are arrayed.

The controller 360 performs control pertaining to calibration. The controller 360 firstly, before the start of a video time period which is a time period for generating a frame, performs activation-time processing for causing a correction value to be calculated. In this activation-time processing, the controller 360 controls the input switching section 270 by the input switching signal SWin to cause input of test signals. In addition, the controller 360 uses the output switching signal SWout to control the selector 340 and thereby cause output of a digital signal to the gain error measurement section 310. In addition, the controller 360 uses the capacitance ratio control signal Gctrl to control the comparator 400 and cause switching between each of the M gain domains in order. In addition, the controller 360 uses the measurement target domain information to cause the correction value calculation section 320 to calculate the correction value for each of the M gain domains in order.

Then, in a video time period, the controller 360 uses the input switching signal SWin to cause input of a pixel signal, and uses the output switching signal SWout to control the selector 340 to cause output of a digital signal to the correction section 350. In addition, the controller 360 uses the capacitance ratio control signal Gctrl to cause switching to a gain domain corresponding to the analog gain indicated by the setting information. In addition, the controller 360 uses the correction target domain information to cause correction of a digital signal using the correction value for the gain domain corresponding to the analog gain indicated by the setting information.

Next, in a vertical blanking time period, the controller 360 executes division processing in which processing performed in activation-time processing is divided and then processed. In the division processing, the controller 360 uses the input switching signal SWin to cause input of a test signal, and uses the output switching signal SWout to cause output of a digital signal to the gain error measurement section 310. In addition, the controller 360 uses the capacitance ratio control signal Gctrl to control the comparator 400 to cause switching to one of the M gain domains. In addition, the controller 360 uses the measurement target domain information to cause the correction value calculation section 320 to calculate the correction value for any one of the M gain domains.

In the activation-time processing and the division processing, the controller 360 supplies the number of samples indicated by the setting information to the gain error measurement section 310, and uses the control signal Tin to control the test signal source 220 and cause test signals for the number of samples to be generated.

Note that the controller 360 is an example of a controller set forth in the claims.

As described above, the setting information includes the analog gain set for the video time period and the number of samples in the activation-time processing and the division processing. The number of samples for the activation-time processing is referred to below as the "total number of samples," and the number of samples for division processing is referred to below as the "number of divided samples." In addition, the setting information includes a drive mode. This drive mode, for example, indicates the resolution of a frame to be read out or one of a plurality of modes having different ranges to be read out.

Figure 9:
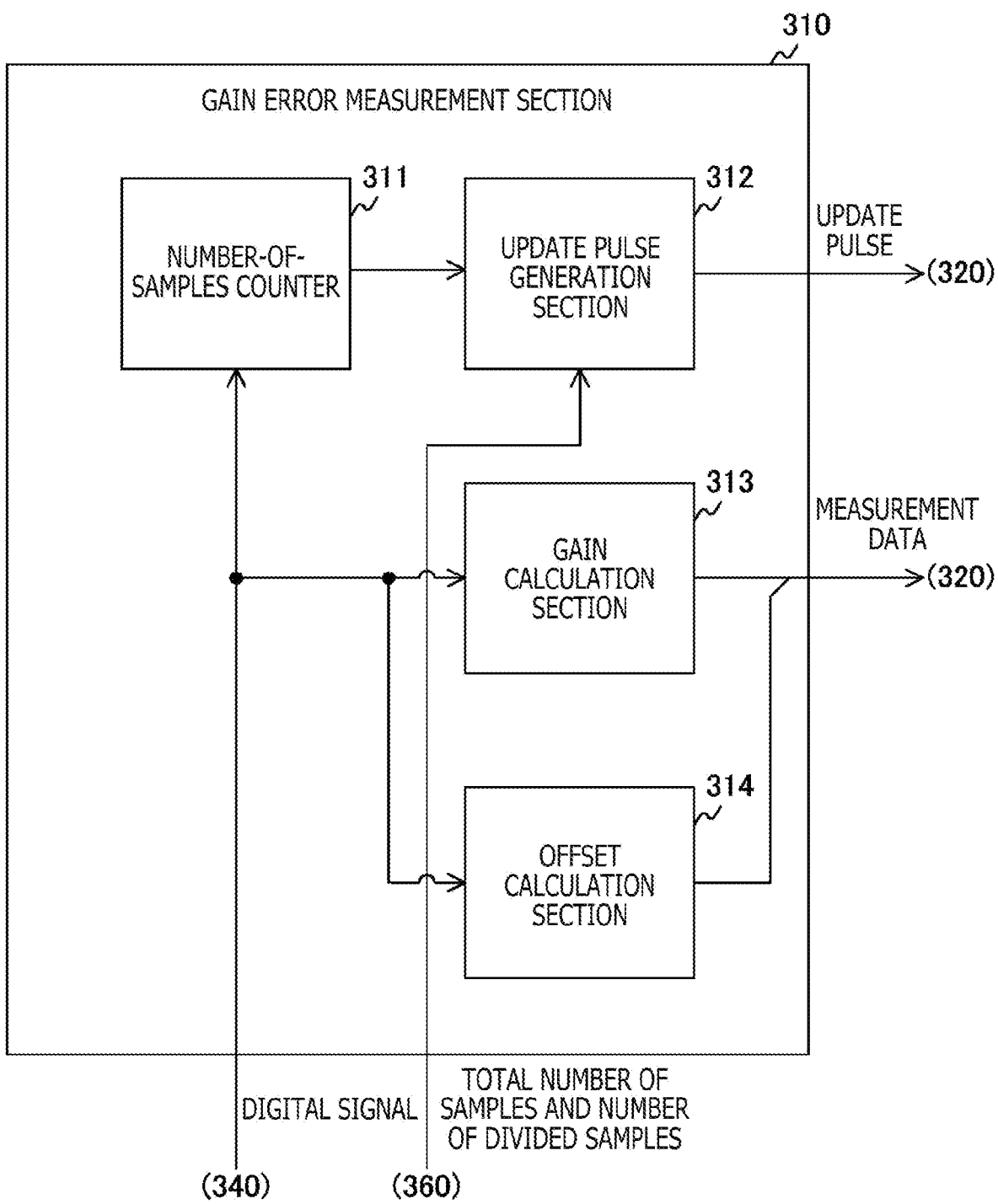
FIG. 9 is a block diagram illustrating an example of a configuration of a gain error measurement section in the first embodiment of the present technology.

FIG. 9 is a block diagram illustrating an example of a configuration of the gain error measurement section 310 in the first embodiment of the present technology. The gain error measurement section 310 includes a number-of-samples counter 311, an update pulse generation section 312, a gain calculation section 313, and an offset calculation section 314.

The number-of-samples counter 311 counts, as the number of samples, the number of digital signals inputted from the selector 340. The number-of-samples counter 311 supplies the number of samples to the update pulse generation section 312.

The update pulse generation section 312 generates an update pulse on the basis of the number of samples counted by the number-of-samples counter 311. This update pulse generation section 312 is inputted with the total number of samples and the number of divided samples from the controller 360. In the activation-time processing, when the number of samples has become the total number of samples, the update pulse generation section 312 generates an update pulse and supplies the update pulse to the correction value calculation section 320. In addition, in the division processing, when the number of samples has become the number of divided samples, the update pulse generation section 312 generates an update pulse and supplies the update pulse to the correction value calculation section 320. Here, the number of divided samples means a total number of samples for each gain domain to be obtained over a predetermined frame in the division processing.

The gain calculation section 313 calculates a luminance level error for each column and each gain domain. The gain calculation section 313 uses the following formula to calculate an inclination g, for each column and each gain domain.

$$g = (Dout_H - Dout_L)/(Ain_H - Ain_L) \qquad \text{Formula 2}$$

In the above formula, $Ain_H$ is a high-level input signal, and $Ain_L$ is a low-level input signal. $Dout_H$ is a digital signal corresponding to $Ain_H$, and $Dout_L$ is a digital signal corresponding to $Ain_H$.

Here, in the activation-time processing, the test signal source 220 generates a predetermined number of high-level test signals and a predetermined number of low-level test signals, for all gain domains. The total of these test signals corresponds to the total number of samples. For example, in a case where there are M gain domains and 128 pieces of each of high-level test signals and low-level test signals are generated for each gain domain, M×128×2 is set as the total number of samples.

In addition, in the division processing, one measurement target gain domain is set over a time period in which a predetermined number of frames are captured, and a predetermined number of high-level test signals and a predetermined number of low-level test signals are generated each time a frame is captured. The total of these test signals corresponds to the number of divided samples. For example, in a case where 128 pieces of each of high-level test signals and low-level test signals are generated for each frame over a time period for two frames for a certain gain domain, the number of divided samples for this gain domain is set to 2×128×2.

The gain calculation section 313 calculates, as STg, a statistic (such as an average or a total) for the inclination g for each gain domain and each column. The statistic for the m-th gain domain and the n-th column is referred to as $STg_{cn\_dm}$. In the activation-time processing, the statistic $STg_{cn\_dm}$ is calculated for all gain domains. In contrast, in the division processing, the statistic $STg_{cn\_dm}$ is calculated for the measurement target gain domain, for each frame.

The offset calculation section 314 calculates an offset for each column and each gain domain. This offset calculation section 315 calculates the offset for each column in a gain domain.

The offset calculation section 314 calculates, as STo, an offset statistic (such as an average or a total) for each gain domain and each column. The statistic STo for the m-th gain domain and the n-th column is referred to as $STo_{cn\_dm}$. In the activation-time processing, the statistic $STo_{cn\_dm}$ is calculated for all gain domains. In contrast, in the division processing, the statistic $STo_{cn\_dm}$ is calculated for the measurement target gain domain, for each frame.

The gain calculation section 313 and the offset calculation section 314 supply, as measurement data, data including a calculation result to the correction value calculation section 320. Note that the gain error measurement section 310 calculates an offset in addition to calculating a gain, but only the gain may be calculated without performing this calculation in a case where there is a small error, etc.

Figure 10:
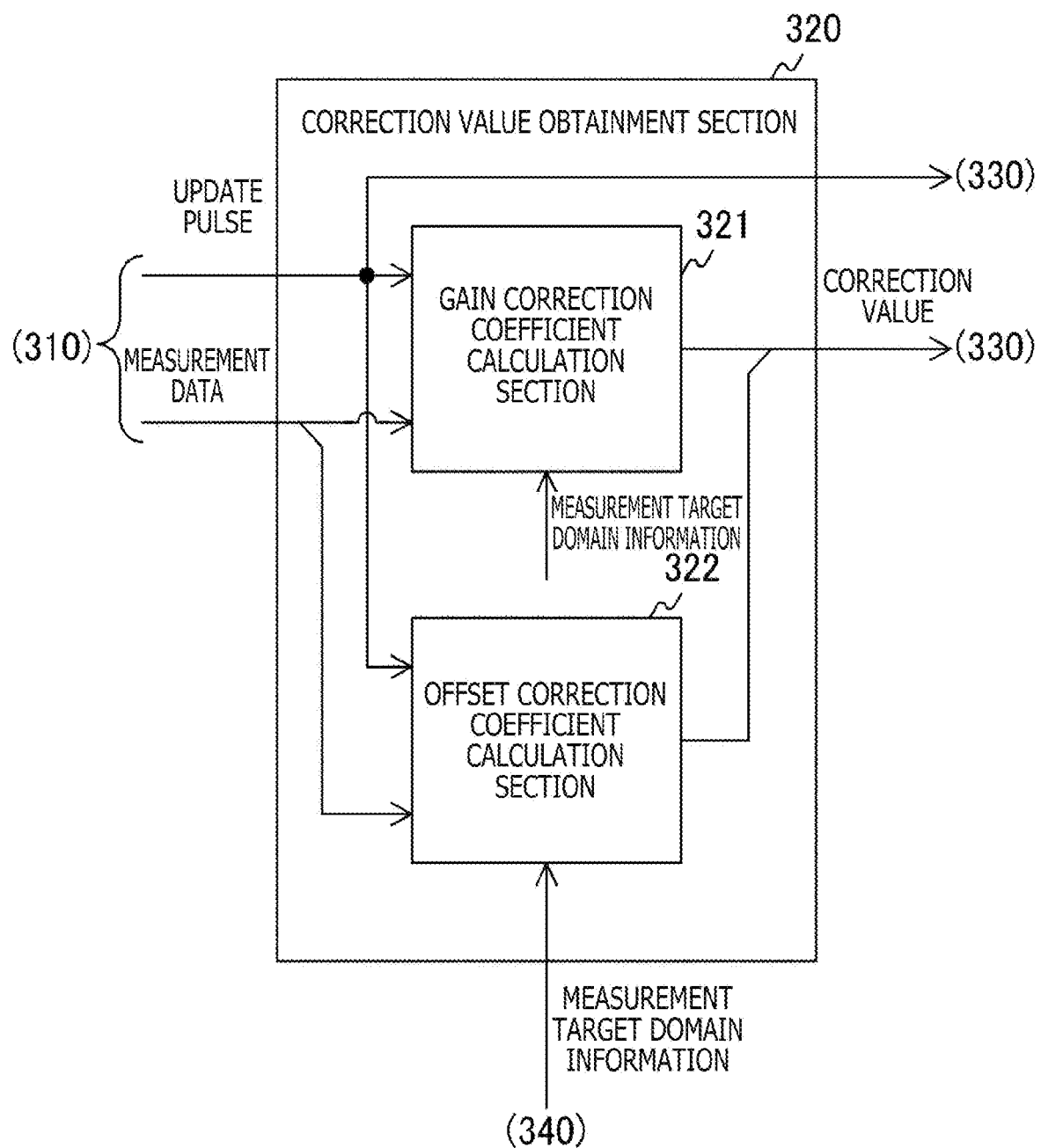
FIG. 10 is a block diagram illustrating an example of a configuration of a correction value calculation section in the first embodiment of the present technology.

FIG. 10 is a block diagram illustrating an example of a configuration of the correction value calculation section 320 in the first embodiment of the present technology. The correction value calculation section 320 includes a gain correction coefficient calculation section 321 and an offset correction coefficient calculation section 322.

The gain correction coefficient calculation section 321 calculates the gain correction coefficient "a" for each column and each gain domain. For the gain domain d0, the gain correction coefficient calculation section 321 calculates an average of the statistic $STg_{cn\_dm}$ for all columns as a target value $AVGg_{d0}$. The gain correction coefficient calculation section 321 then calculates $AVGg_{d0}/STg_{cn\_dm}$ as the gain correction coefficient "a" for each column. For the gain domain d1 and thereafter, the gain correction coefficient calculation section 321 corrects the average of the statistic $STg_{cn\_dm}$ for all columns for the gain domain dm on the basis of target value $AVGg_{d0}$ for the gain domain d0, so that linearity is obtained for an analog gain. The gain correction coefficient calculation section 321 then sets the corrected average as the target value $AVGg_{dm}$ for the gain domain dm, and, for each column, calculates $AVGg_{dm}/STg_{cn\_dm}$ as the gain correction coefficient a. The gain correction coefficient for the m-th gain domain and the n-th column is referred to as $a_{cn\_dm}$.

In the activation-time processing, the gain correction coefficient calculation section 321 calculates the gain correction coefficient $a_{cn\_dm}$ for each of all of the gain domains, and stores each gain correction coefficient $a_{cn\_dm}$ to the storage section 330 in synchronization with an update pulse. In addition, in the division processing, the gain correction coefficient calculation section 321 calculates the gain correction coefficient $a_{cn\_dm}$ for the gain domain indicated by the measurement target domain information, and stores this gain correction coefficient $a_{cn\_dm}$ to the storage section 330 in synchronization with an update pulse.

The offset correction coefficient calculation section 322 calculates the offset correction coefficient "b" for each column and each gain domain. In the gain domain d0, the offset correction coefficient calculation section 322 calculates, as the offset correction coefficient "b", the average of the low-level AD conversion value for each column. In the gain domain d1 and thereafter, the offset correction coefficient "b" for each column is calculated by a similar calculation. The offset correction coefficient for the m-th gain domain and the n-th column is referred to as $b_{cn\_dm}$.

In the activation-time processing, the offset correction coefficient calculation section 322 calculates the offset correction coefficient $b_{cn\_dm}$ for each of all of the gain domains, and stores each offset correction coefficient $b_{cn\_dm}$ to the storage section 330 in synchronization with an update pulse. In addition, in the division processing, the offset correction coefficient calculation section 322 calculates the gain correction coefficient $a_{cn\_dm}$ for the gain domain indicated by the measurement target domain information, and stores this gain correction coefficient $a_{cn\_dm}$ to the storage section 330 in synchronization with an update pulse.

Figure 11:
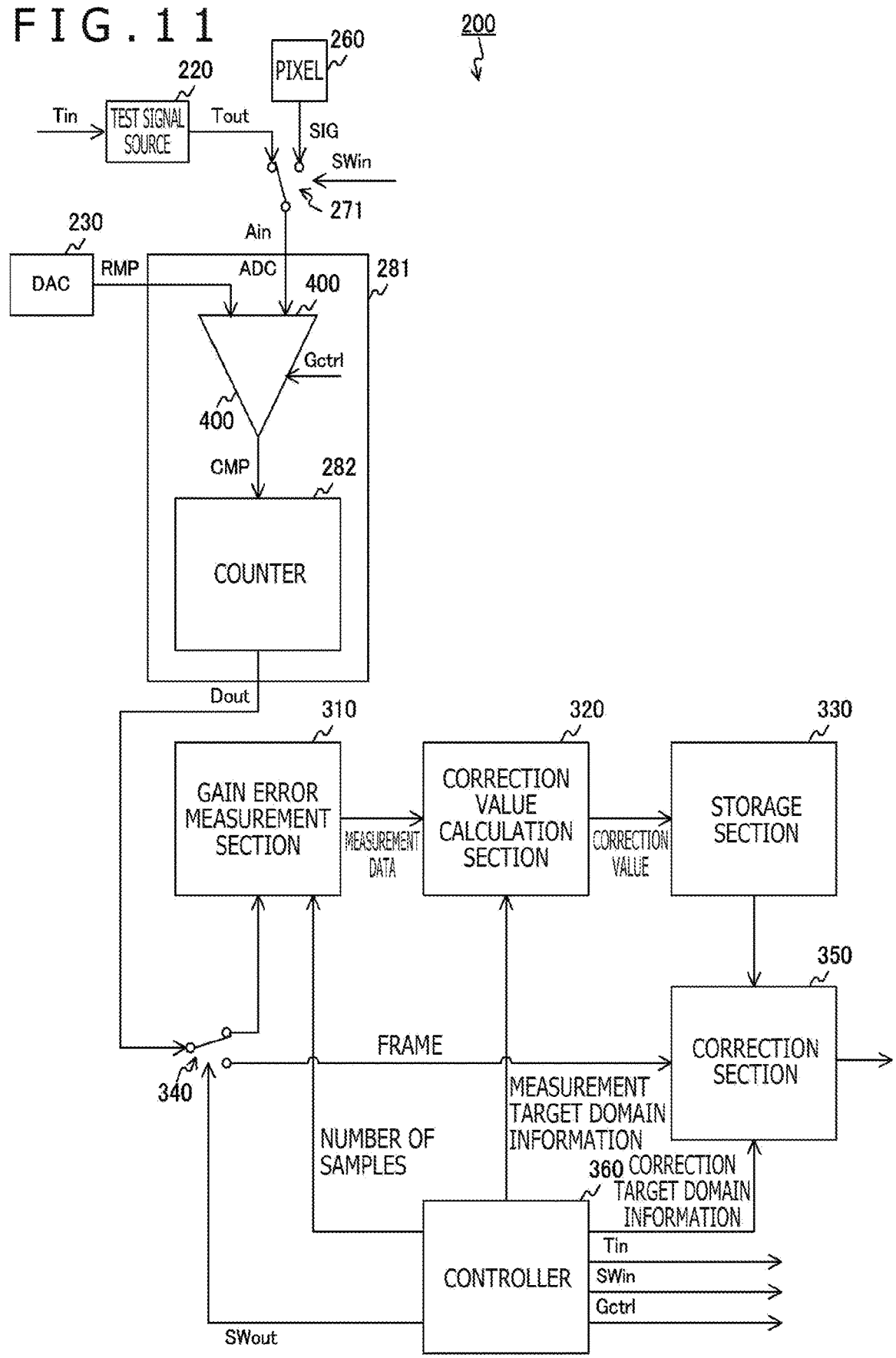
FIG. 11 is a diagram for describing a method for correcting an error in the first embodiment of the present technology.

FIG. 11 is a diagram for describing a method for correcting an error in the first embodiment of the present technology. The pixel 260 generates a pixel signal SIG, and the test signal source 220 generates a test signal Tout having a predetermined level (high level or low level).

According to the input switching signal SWin, the selector 271 in the input switching section 270 selects one a test signal Tout and a pixel signal SIG for a corresponding column, and supplies the signal to the ADC 281 for the corresponding column as an input signal Ain.

The ADC 281 uses an analog gain selected from a plurality of analog gains according to the capacitance ratio control signal Gctrl to increase or decrease the analog input signal Ain, and converts the increased or decreased input signal Ain to the digital signal Dout.

The selector 340, according to the output switching signal SWout, selects, as an output destination, one of the gain error measurement section 310 and the correction section 350, and outputs the digital signal Dout.

In order to correct an analog gain or an offset error, the gain error measurement section 310 measures an analog gain and offset for each column and each gain domain, and supplies this measured analog gain and offset to the correction value calculation section 320 as measurement data.

On the basis of a relationship between the test signal Tout (input) and the digital signal Dout (output), the correction value calculation section 320 obtains a correction value for correcting an error in analog gain etc., for each column and each gain domain, and outputs the correction value to the storage section 330.

The correction section 350 then uses the outputted correction value to correct the digital signal Dout. By this correction, it is possible to remove the fixed pattern noise that has a vertical streak shape and is caused by variation in analog gain for each column.

In addition, the controller 360 performs activation-time processing for causing selection of each of the plurality of gain domains before a video time period. The controller 360 then performs division processing for causing the measurement target gain domain inside a vertical blanking time period to change each time a predetermined number of frames are generated.

Figure 12A:
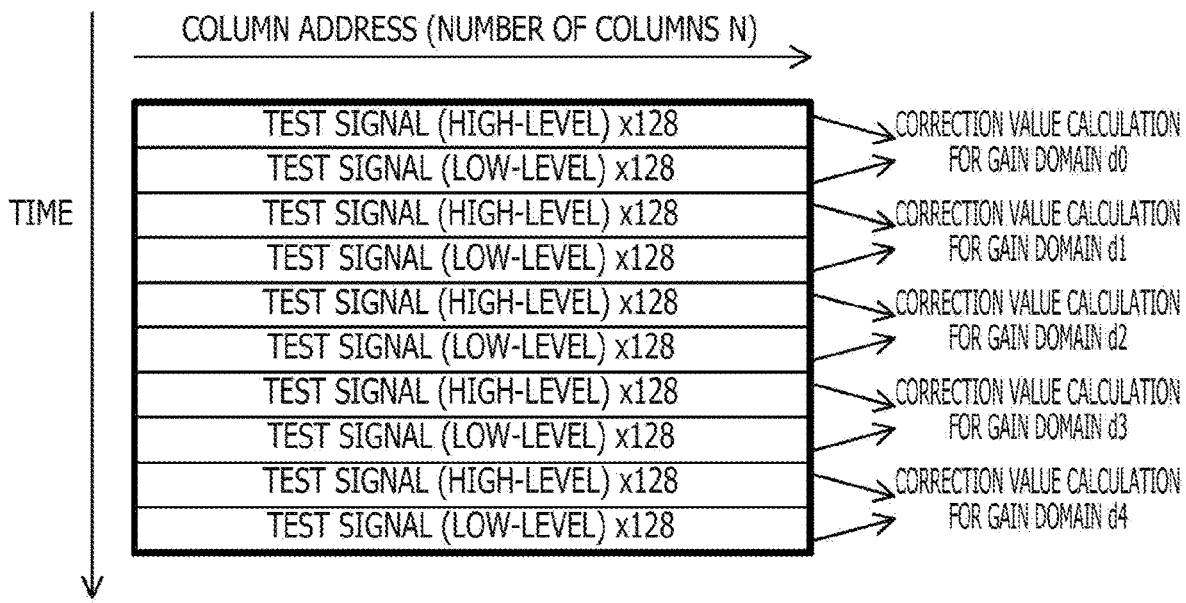
FIGS. 12A and 12B are views illustrating an example of test signals and a frame in the first embodiment of the present technology.
Figure 12B:
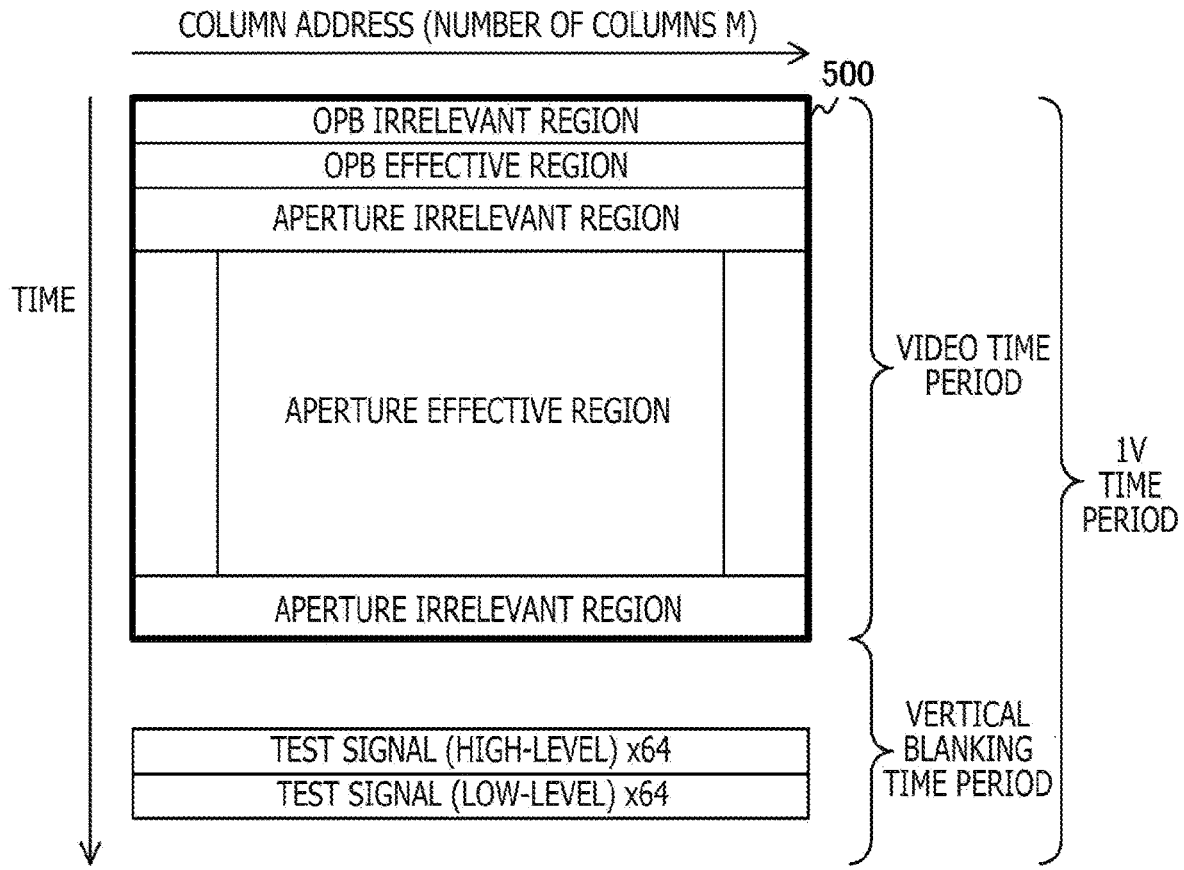

FIGS. 12A and 12B are views illustrating an example of test signals and a frame in the first embodiment of the present technology. FIG. 12A is a view illustrating an example of test signals supplied in activation-time processing. FIG. 12B is a view illustrating an example of a frame and test signals supplied in division processing. The horizontal axis in FIGS. 12A and 12B are column address, and the vertical axis indicates time.

As exemplified by in FIG. 12A, in activation-time processing, for each of the gain domains d0 through d4, the test signal source 220 supplies, for all columns, a predetermined number (such as 128) of high-level test signals and a predetermined number (such as 128) of low-level test signals. The number of test signals corresponds to the number of samples. Correction values for respective columns and respective gain domains are calculated on the basis of a digital signal resulting from performing an AD conversion on these test signals.

In addition, as exemplified in in FIG. 12B, a 1V time period which is the period of the vertical sync signal includes a video time period and a vertical blanking time period. The video time period is a time period in which a frame 500 is generated, and the vertical blanking time period is a time period in which a frame 500 is not generated.

The frame 500 includes an OPB (OPtical Black) irrelevant region, an OPB effective region, aperture irrelevant regions, an aperture effective region, etc.

The controller 360 performs division processing in a vertical blanking time period. At this time, the test signal source 220 supplies all columns with a predetermined number of high-level test signals and a predetermined number of low-level test signals for the measurement target gain domain. Note that, in a case where the same number of samples as the number of samples (such as 128) in activation-time processing are obtained over two frames in division processing, the number of samples for each frame is halved (such as 64) with respect to activation time.

Figure 13:
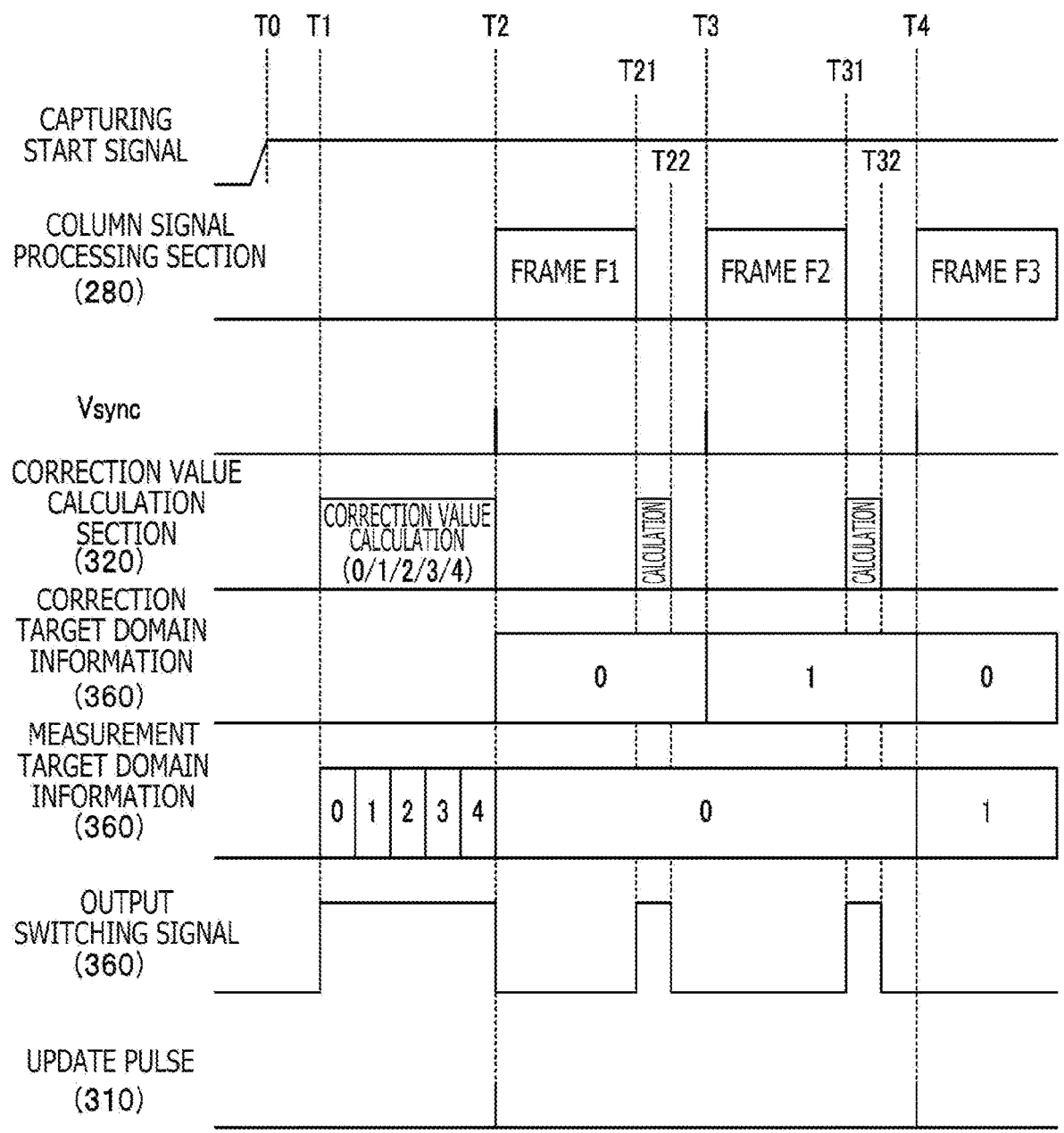
FIG. 13 is a timing chart illustrating an example of operation by a solid-state image capturing element in a time period until generation of a third frame, in the first embodiment of the present technology.

FIG. 13 is a timing chart illustrating an example of operation by the solid-state image capturing element 200 in a time period until generation of a third frame, in the first embodiment of the present technology.

When a capturing start signal is inputted from the host computer at timing T0, the controller 360 performs activation-time processing in a time period between timings T1 to T2.

In the activation-time processing, the correction value calculation section 320 calculates a correction value for each column for each of the gain domains d0 through d4, under control by the controller 360. In addition, the controller 360 sets measurement target domain information for the gain domains d0 through d4 in this order. In addition, the controller 360 sets an output switching signal to the high level, and causes output of a digital signal to the gain error measurement section 310. In addition, at the timing T2, the gain error measurement section 310 generates an update pulse, and a vertical sync signal Vsync pulse is inputted to the solid-state image capturing element 200.

In a video time period from the timing T2 to timing T21, the column signal processing section 280 generates a first frame F1. In addition, the controller 360 sets the output switching signal to the low level, and causes output of a digital signal to the correction section 350.

Next, in a vertical blanking time period, the controller 360 performs division processing from the timing T21 to timing T22. At the timing T22, the controller 360 sets the output switching signal to the high level, and causes output of a digital signal to the gain error measurement section 310.

In the division processing, the correction value calculation section 320 calculates a correction value for each column for the measurement target gain domain d0, under control by the controller 360. In addition, the controller 360 sets measurement target domain information for the gain domain d0. In addition, from the timing T21 to timing T22, the controller 360 sets the output switching signal to the high level, and causes output of a digital signal to the gain error measurement section 310. At the timing T22, the controller 360 sets the output switching signal to the low level, and causes output of a digital signal to the correction section 350.

At timing T3, a vertical sync signal Vsync pulse is inputted to the solid-state image capturing element 200. According to brightness etc., the controller 360 updates correction target domain information for the gain domain d1 etc.

In a video time period from the timing T3 to timing T31, the column signal processing section 280 generates a second frame F2.

In a vertical blanking time period, the controller 360 performs division processing from the timing T31 to timing T32. The correction value calculation section 320 calculates a correction value for each column for the measurement target gain domain d0, under control by the controller 360. In addition, from the timing T31 to timing T32, the controller 360 sets the output switching signal to the high level, and causes output of a digital signal to the gain error measurement section 310. At the timing T32, the controller 360 sets the output switching signal to the low level, and causes output of a digital signal to the correction section 350.

In addition, at timing T4, the gain error measurement section 310 generates an update pulse, and a vertical sync signal Vsync pulse is inputted to the solid-state image capturing element 200.

FIG. 14 is a timing chart illustrating an example of operation by the solid-state image capturing element 200 in a time period until generation of a sixth frame, in the first embodiment of the present technology. Operation by the solid-state image capturing element 200 from the timing T4 to timing T6 is similar to that from the timing T2 to timing T4 except that the measurement target domain information is changed to the gain domain d1. Operation by the solid-state image capturing element 200 from the timing T6 to timing T8 is similar to that from the timing T2 to timing T4 except that the measurement target domain information is changed to the gain domain d2.

Figure 15:
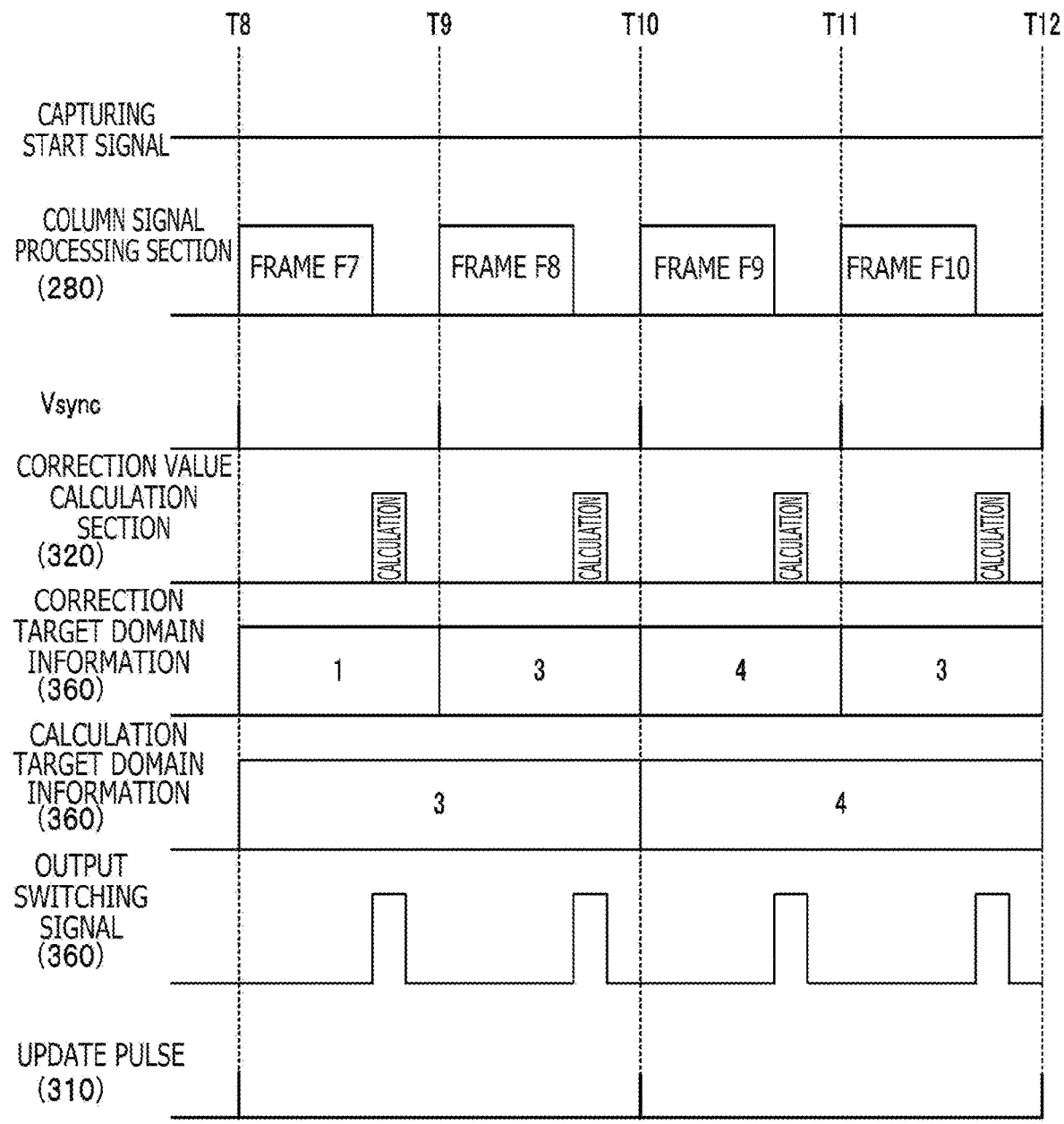
FIG. 15 is a timing chart illustrating an example of operation by a solid-state image capturing element in a time period until generation of a tenth frame, in the first embodiment of the present technology.

FIG. 15 is a timing chart illustrating an example of operation by the solid-state image capturing element 200 in a time period until generation of a tenth frame, in the first embodiment of the present technology. Operation by the solid-state image capturing element 200 from the timing T8 to timing T10 is similar to that from the timing T2 to timing T4 except that the measurement target domain information is changed to the gain domain d3. Operation by the solid-state image capturing element 200 from the timing T10 to timing T12 is similar to that from the timing T2 to timing T4 except that the measurement target domain information is changed to the gain domain d4. At the timing T12 and thereafter, control for the timings T2 through T12 is repeatedly executed.

Note that there are cases where, depending on the drive mode, the configuration of a comparator to be used or gain domains may differ. In this case, a gain domain correction value corresponding to the drive mode is selected, as appropriate.

As exemplified in FIG. 13 through FIG. 15, the controller 360 performs activation-time processing before a video time period. In this activation-time processing, correction values are calculated for all of the gain domains d0 through d4 in this order.

Then, in a vertical blanking time period after this video time period, the controller 360 performs division processing resulting from dividing the activation-time processing. In this division processing, each time two frames are generated, the measurement target gain domain is changed in a predetermined order. Note that, although the controller 360 switches the gain domain for each of two frames, the controller 360 can switch the gain domain for each of a predetermined number ("1," "3," etc.) of frames where the predetermined number is not two.

By the activation-time processing, variation in analog gain for each column due to manufacturing variation is corrected, and fixed pattern noise with a vertical streak shape is removed. As a result, the image quality of image data (frame) improves.

In addition, by division processing for each frame, variation in analog gain for each column due to deterioration over time is corrected, and fixed pattern noise with a vertical streak shape is removed.

Here, a comparative example, in which the controller 360 performs processing with the same content as the activation-time processing for each certain frame and does not divide the activation-time processing, is envisioned.

FIG. 16 is a timing chart illustrating an example of operation by a solid-state image capturing element in the comparative example. The controller 360 in the comparative example performs activation-time processing in a time period from timings T1 through T2. In a vertical blanking time period from timings T21 to T3 after a frame F1 is generated, the controller 360 performs processing with the same content as in the activation-time processing in the time period from the timing T1 to timing T2. As a result, correction values are calculated for all of the gain domains d0 through d4. Subsequently, for each single frame, correction values are calculated for all of the gain domains d0 through d4.

To calculate correction values for all of the gain domains d0 through d4, the test signal source 220 needs to generate a plurality of test signals in order for each gain domain, and a certain amount of time is required. In the comparative example in which such calibration is performed for each frame, there is a risk that the frame rate decreases as exemplified in FIG. 16.

In contrast to this, by virtue of a configuration in which processing resulting from dividing activation-time processing is performed for each frame as exemplified in FIG. 13 through FIG. 15, it is possible to shorten the amount of time for calibration for each frame in comparison to the comparative example. As a result, it is possible to improve the frame rate.

Figure 17A:
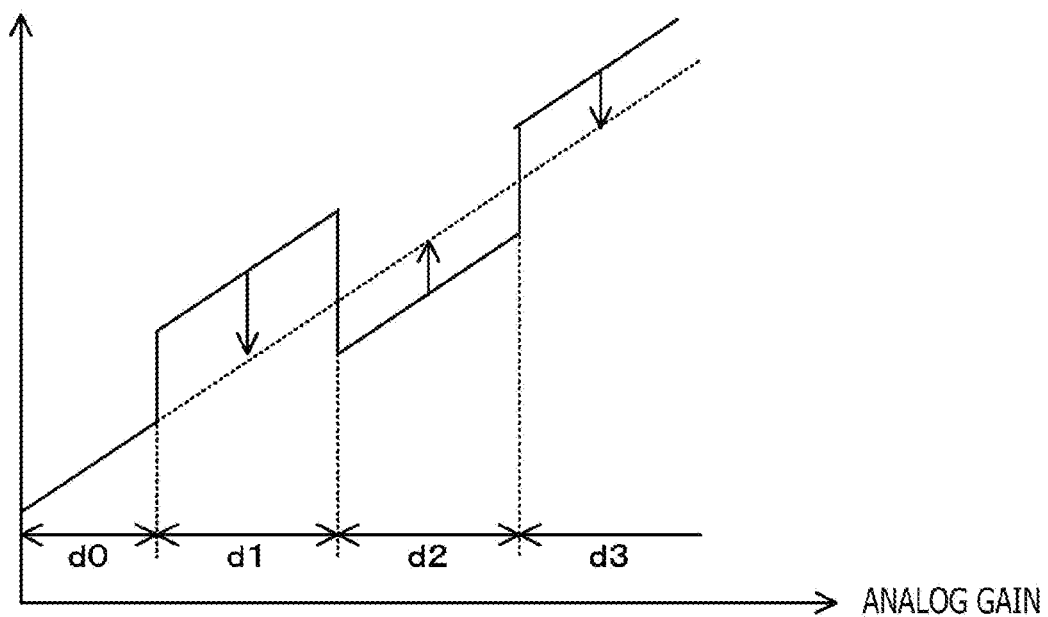
FIGS. 17A and 17B depict diagrams for describing a method for correcting linearity in the first embodiment of the present technology.
Figure 17B:
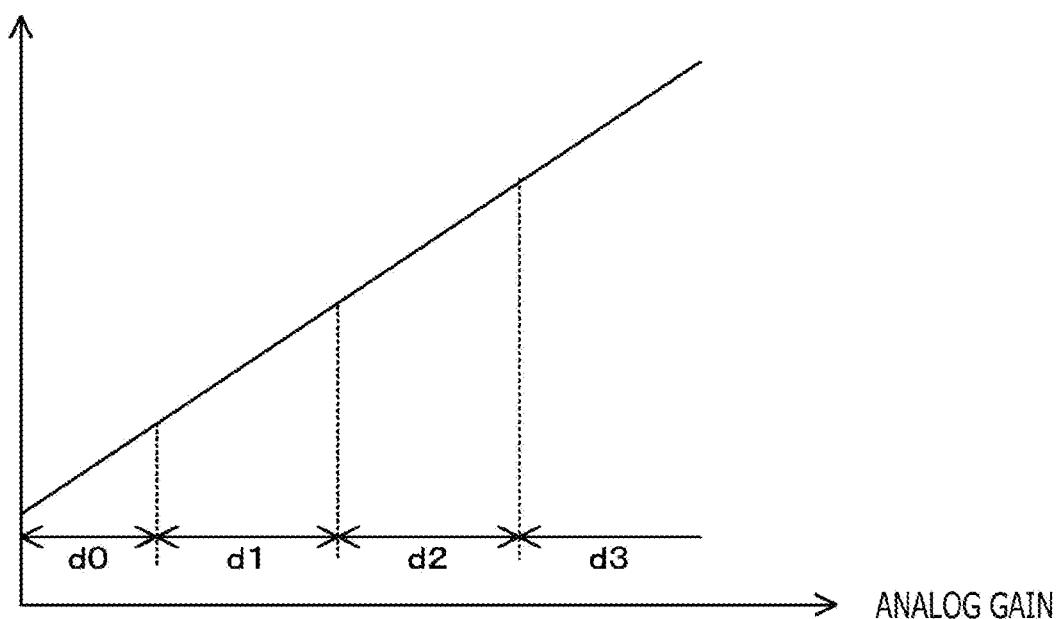

FIGS. 17A and 17B are diagrams for describing a method for correcting linearity in the first embodiment of the present technology. FIG. 17A is an example of a graph illustrating the relationship between the level (in other words, the output level) of the digital signal Dout and the analog gain, in a case where a linearity correction is not performed. FIG. 17B is an example of a graph illustrating the relationship between the output level and the analog gain, in a case where a linearity correction is performed.

A linearity correction is not performed in a case where the gain correction coefficient calculation section 321 does not correct the average of the statistic STgcn_dm for all columns in the gain domain d1 and thereafter on the basis of the target value AVGgd0 for the gain domain d0. In this case, as exemplified in FIG. 17A, in each of the gain domains d1 through d3, the linearity of the output level deviates from that of the gain domain d0.

Accordingly, as exemplified in FIG. 17B, the gain correction coefficient calculation section 321 corrects the average of the statistic STgcn_dm for all columns in the gain domain d1 and thereafter on the basis of the target value AVGgd0 for the gain domain d0 in order to match the straight line in the gain domain d0.

Figure 18A:
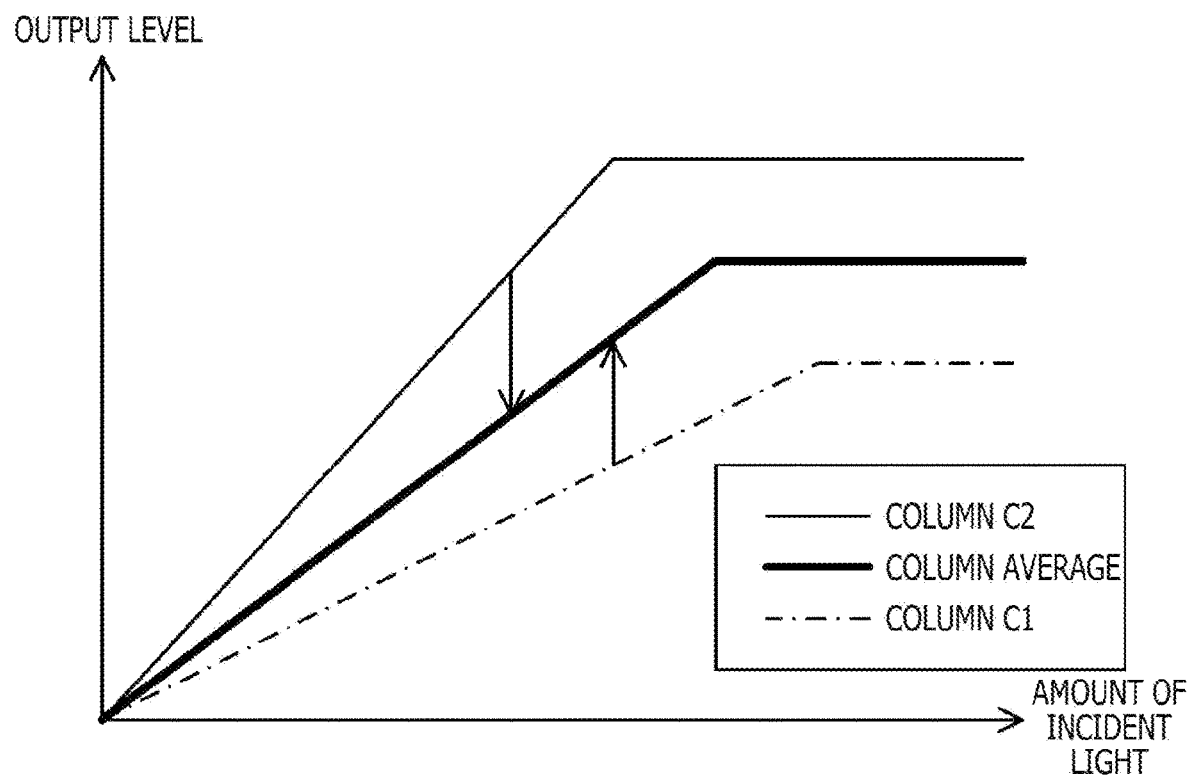
FIGS. 18A and 18B depict diagrams for describing a method for correcting an error in analog gain in the first embodiment of the present technology.
Figure 18B:
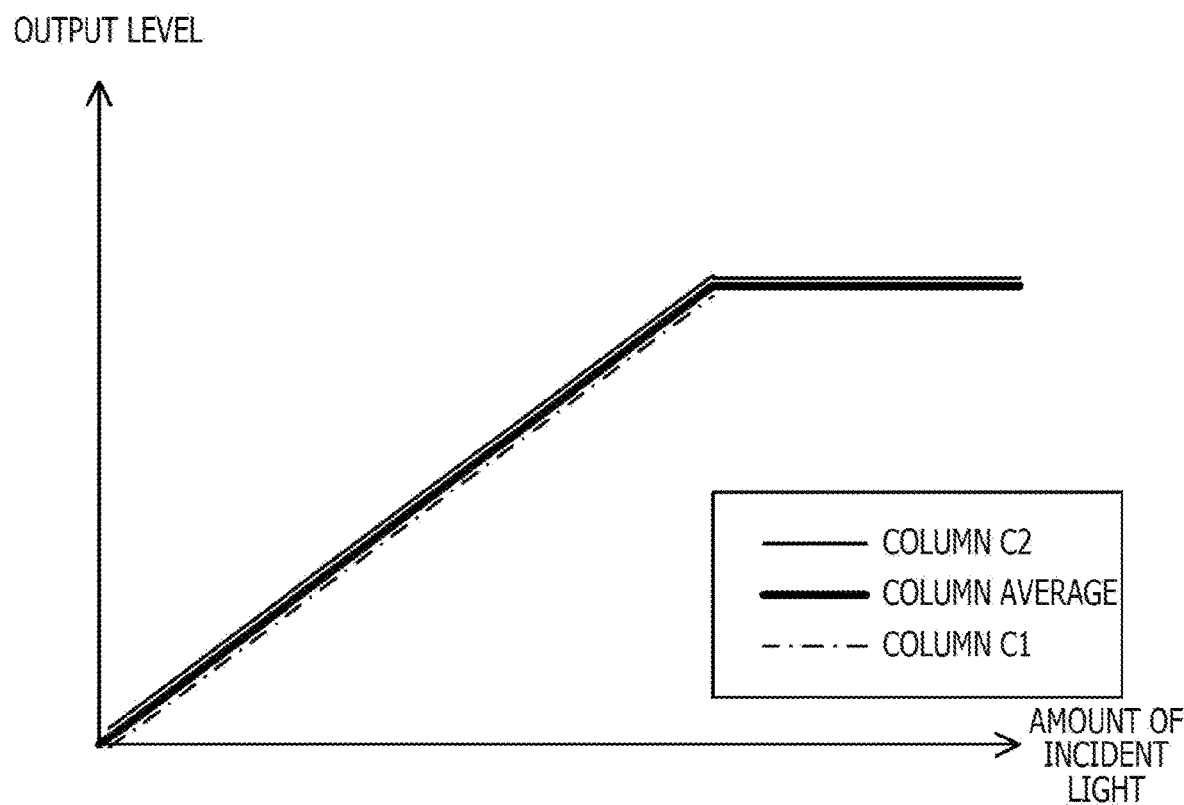

FIGS. 18A and 18B are diagrams for describing a method for correcting an error in analog gain in the first embodiment of the present technology. FIG. 18A is an example of a graph illustrating the relationship between the amount of incident light for each column after offset correction and before analog gain correction, and the output level. FIG. 18B is an example of a graph illustrating the relationship between the amount of incident light for each column after analog gain correction, and the output level. A dashed-dotted line in FIGS. 18A and 18B indicate a characteristic for a first column C1, and a thin solid line in FIGS. 18A and 18B indicate a characteristic for a second column C1. Characteristics for columns other than the columns C1 and C2 are omitted. In addition, a thick solid line indicates an average characteristic for all columns.

As exemplified by FIG. 18A, before analog gain correction, variation arises in the inclination for each column (in other words, in the analog gain) due to, for example, product variation for each column. Accordingly, the correction section 350 uses the gain correction coefficient to correct the digital signal, with the average analog gain for all columns as a target value. As a result, the analog gains for all columns can be aligned to be approximately the same, as exemplified in FIG. 18B. Accordingly, it is possible to remove fixed pattern noise that has a vertical streak shape and is caused by variation in analog gain.

[Example of Operation by Solid-State Image Capturing Element]

Figure 19:
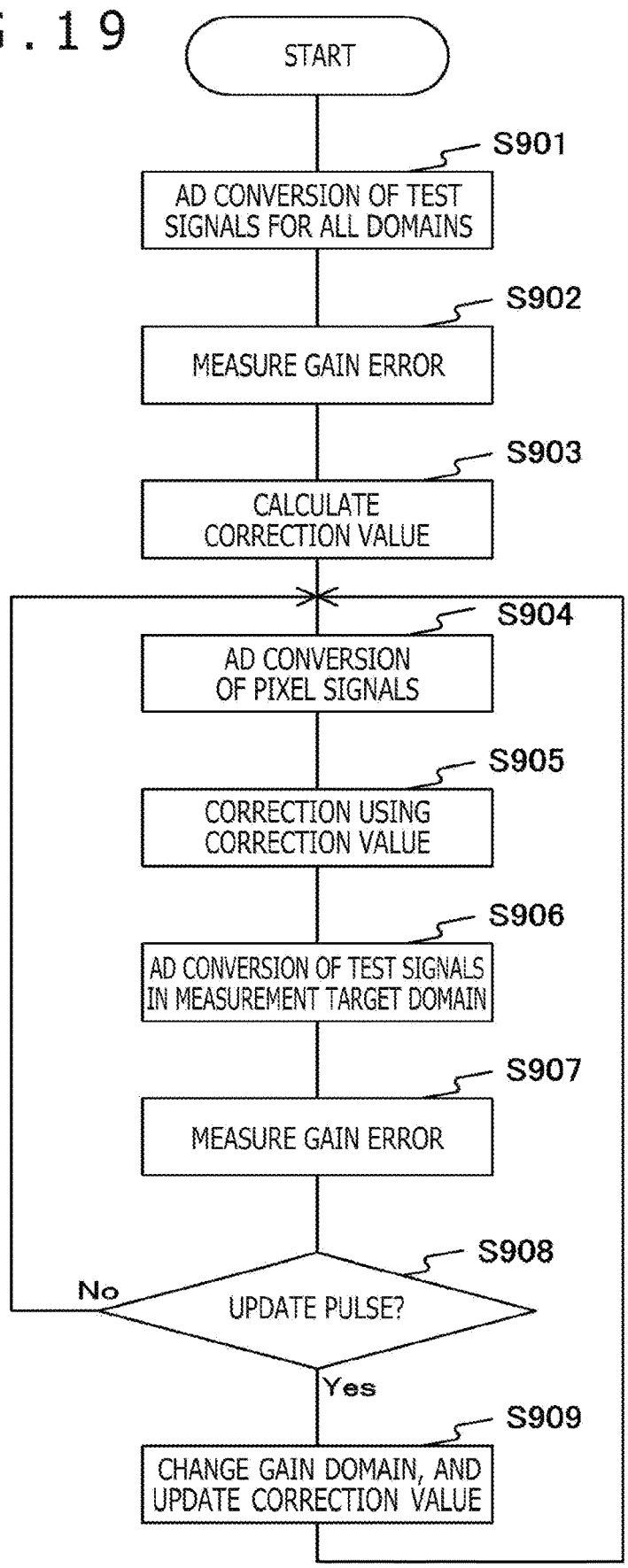
FIG. 19 is a flow chart illustrating an example of operation by a solid-state image capturing element in the first embodiment of the present technology.

FIG. 19 is a flow chart illustrating an example of operation by the solid-state image capturing element 200 in the first embodiment of the present technology. This operation by the solid-state image capturing element 200 is, for example, started when a predetermined application for capturing image data is executed.

The column signal processing section 280 in the solid-state image capturing element 200 performs an AD conversion on test signals for all gain domains (step S901) The gain error measurement section 310 measures a gain error for each column and each gain domain (step S902) The correction value calculation section 320 then calculates a correction value for each column and each gain domain (step S903).

Then, in the video time period, the column signal processing section 280 generates a frame by performing an AD conversion on the pixel signals for all pixels (step S904). The correction section 350 uses the correction values to correct the digital signals in the frame (step S905).

Next, in a vertical blanking time period, the column signal processing section 280 performs an AD conversion on test signals for a measurement target gain domain (step S906). The gain error measurement section 310 measures a gain error for each column for the gain domain (step S907).

The correction value calculation section 320 determines whether or not an update pulse has been generated (step S908). In a case where an update pulse has not been generated (step S908: No), the solid-state image capturing element 200 repeats step S904 and thereafter.

However, in a case where an update pulse has been generated (step S908: Yes), the correction value calculation section 320 calculates a correction value for each column for a correction target gain domain, and performs update according to a calculation result (step S909). After step S909, the solid-state image capturing element 200 repeatedly executes step S904 and thereafter.

In such a manner, by virtue of the first embodiment of the present technology, because the correction value calculation section 320 obtains, for each column, a correction value for correcting an error in analog gain and the correction section 350 uses the correction value to perform correction, it is possible to remove noise caused by variation in analog gain for each column. As a result, the image quality of image data improves. In addition, the controller 360 obtains a correction value for all gain domains before image capturing and, for each of a predetermined number of frames, obtains a correction value for only a measurement target gain domain. As a result, it is possible to improve the frame rate in comparison to a case in which the correction value for all gain domains is obtained for each frame.

2. Second Embodiment

In the first embodiment described above, in the activation-time processing, the test signal source 220 generates, for each gain domain, test signals for the number of samples that is the same as those at a time of division processing. However, with this configuration, the greater the number of gain domains or the number of samples is, the longer an amount of time required for the activation-time processing becomes. A solid-state image capturing element 200 according to this first embodiment differs from that in the first embodiment in that the number of samples for activation-time processing is reduced.

Figure 20A:
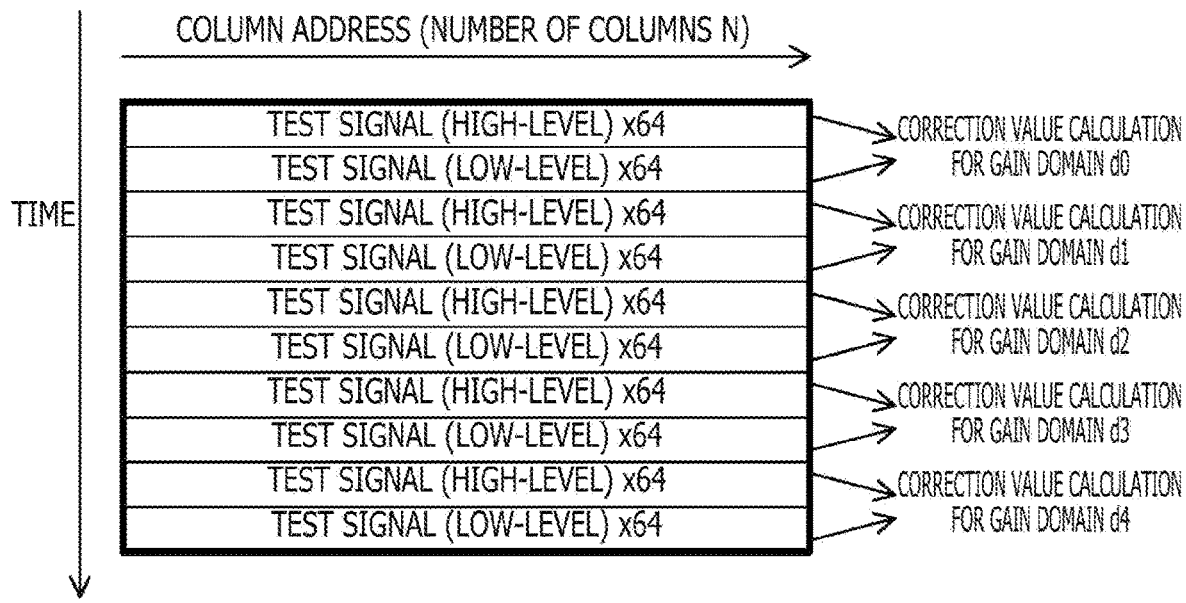
FIGS. 20A and 20B are views illustrating an example of test signals and a frame in a second embodiment of the present technology.
Figure 20B:
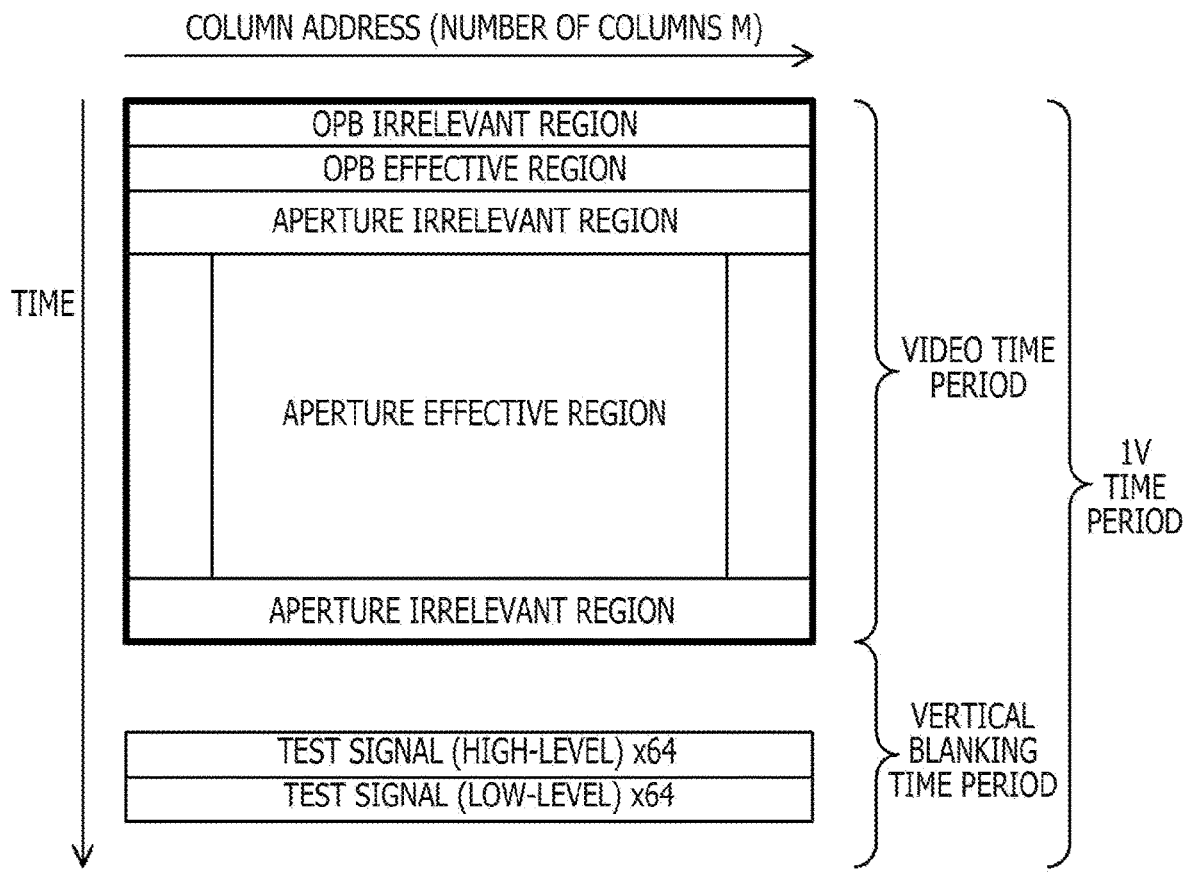

FIGS. 20A and 20B are views illustrating an example of test signals and a frame in the second embodiment of the present technology. FIG. 20A is a view illustrating an example of test signals supplied in activation-time processing. FIG. 20B is a view illustrating an example of a frame and test signals supplied in division processing. The horizontal axis in FIGS. 20A and 20B are column address, and the vertical axis indicates time.

As exemplified by FIGS. 20A and 20B, in the second embodiment, the number of samples for each gain domain in activation-time processing is set to be a value (such as 64) that is lower than the number of samples (such as 128) in division processing. For example, 5×64×2 test signals are generated for five gain domains in the activation-time processing, and 2×64×2 test signals are generated in division processing for two frames.

FIG. 21 is a timing chart illustrating an example of operation by the solid-state image capturing element 200 in a time period until generation of a third frame, in the second embodiment of the present technology.

In activation-time processing from timings T1 to T2, a correction value calculation section 320 calculates a correction value for each column for each of the gain domains d0 through d4, under control by a controller 360. At this time, the number of samples for each gain domain is set to a value lower than the number of samples for division processing. As a result, it is possible to shorten the amount of time required for activation-time processing, in comparison with the first embodiment in which the number of samples for each gain domain in activation-time processing is made to be the same value as the number of samples in division processing. It is desirable to apply the second embodiment for such a use case where shortening activation time is prioritized and correction during operation is perfect even if performance immediately after activation deteriorates somewhat. For example, there is a case where a preview moving image is outputted at a time of activation, and the second embodiment is applied in this case because there is no need for performance to be perfect immediately after activation.

In such a manner, by virtue of the second embodiment of the present technology, because the controller 360 sets the number of samples for each gain domain in activation-time processing to be lower than the number of samples in division processing, it is possible to proportionally shorten the amount of time for activation-time processing.

3. Third Embodiment

In the first embodiment described above, the solid-state image capturing element 200 updates the correction value by changing a correction target gain domain for each of a predetermined number of frames. However, with this configuration, there is a risk that the correction value suddenly changes due to the update and the signal level between frames changes unnaturally. The solid-state image capturing element 200 in the third embodiment differs from the first embodiment in that an infinite impulse response (IIR) filter is used to gradually change the correction value.

Figure 22:
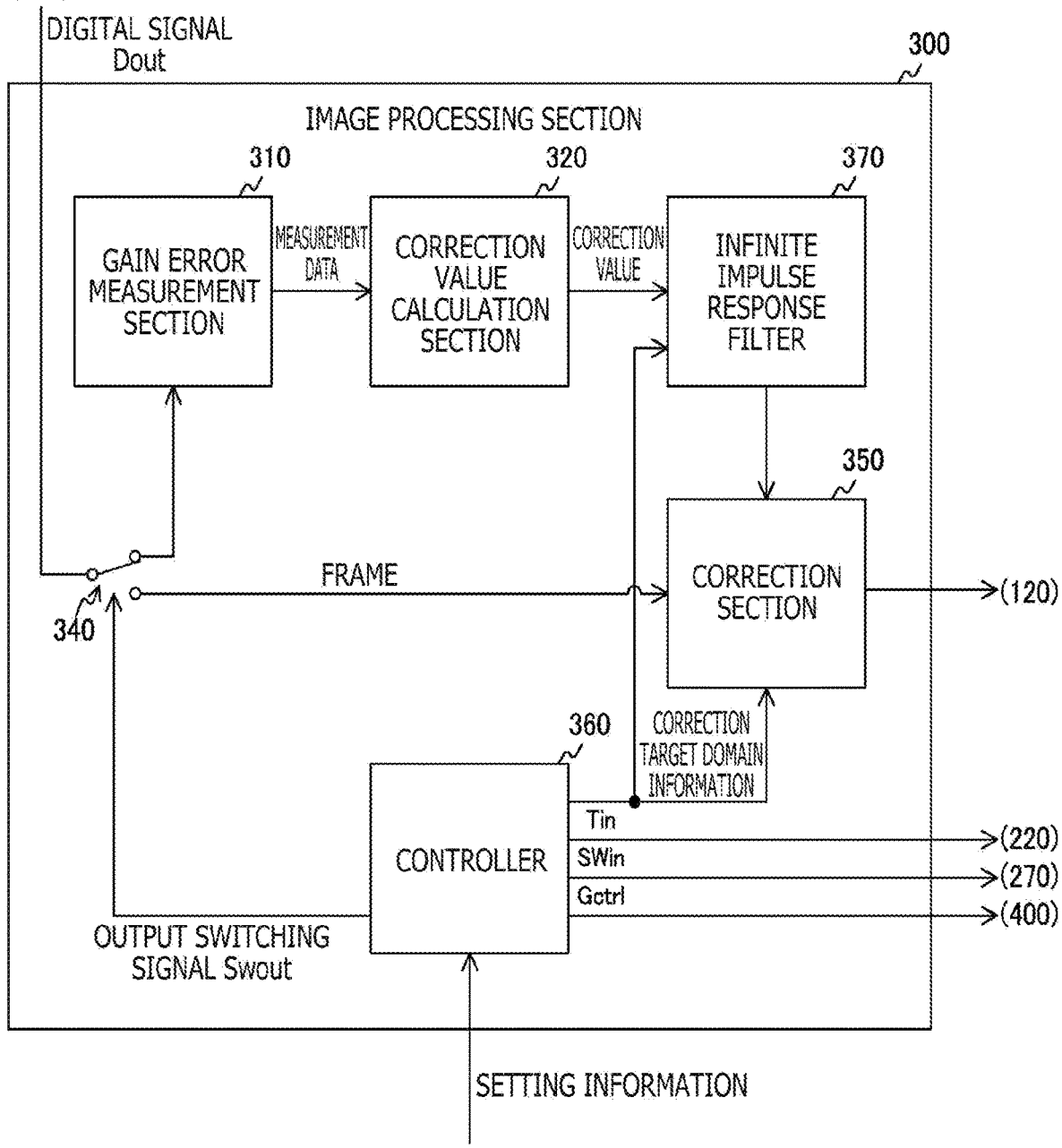
FIG. 22 is a block diagram illustrating an example of a configuration of an image processing section in a third embodiment of the present technology.

FIG. 22 is a block diagram illustrating an example of a configuration of an image processing section 300 in the third embodiment of the present technology. The image processing section 300 in this third embodiment differs from that in the first embodiment in being provided with an infinite impulse response filter 370 in place of the storage section 330.

In addition, a controller 360 in the third embodiment does not generate measurement target domain information, and does not supply the number of samples. In addition, the controller 360 supplies the correction target domain information also to the infinite impulse response filter 370. In addition, the gain error measurement section 310 in the third embodiment does not generate an update pulse.

The infinite impulse response filter 370 outputs, to a correction section 350, an infinite impulse response with respect to the correction value from the correction value calculation section 320. Note that the infinite impulse response filter 370 is an example of a filter set forth in the claims.

FIG. 23 is a block diagram illustrating an example of a configuration of the infinite impulse response filter 370 in the third embodiment of the present technology. The infinite impulse response filter 370 includes an adder 371, a subtractor 372, multipliers 373 and 374, a multiplexer 375, a storage section 376, and a demultiplexer 377.

The adder 371 adds together a correction value (in other words, an input value) from the correction value calculation section 320, and a multiplication result from the multiplier 374. This adder 371 supplies an addition result to the subtractor 372.

The subtractor 372 subtracts an output value from the multiplexer 375 from the addition result from the adder 371. This subtractor 372 supplies a subtraction result to the multiplier 373.

The multiplier 373 multiplies the subtraction result from the subtractor 372 by 1/α which is the inverse of a coefficient α (α is a real number). This multiplier 373 supplies a multiplication result, as a correction value, to the correction section 350 and the demultiplexer 377.

The demultiplexer 377 updates a correction value inside the storage section 376 for a gain domain indicated by the correction target domain information to be the output value from the multiplier 373. The storage section 376 holds a correction value for each column and each gain domain.

The multiplexer 375 reads out a correction value for the gain domain indicated by the correction target domain information from the storage section 376, and outputs the correction value to the multiplier 374 and the subtractor 372.

The multiplier 374 multiplies the output value from the multiplexer 375 by the coefficient α. The multiplier 374 supplies a multiplication result to the adder 371.

By the configuration described above, the infinite impulse response filter 370, for which a transfer function H(Z) is represented by the following formula, is realized.

$$H(Z) = (1/\alpha) \cdot \{1 - (\alpha-1) \cdot Z^{-1}/\alpha\}^{-1} \qquad \text{Formula 3}$$

Figure 24A:
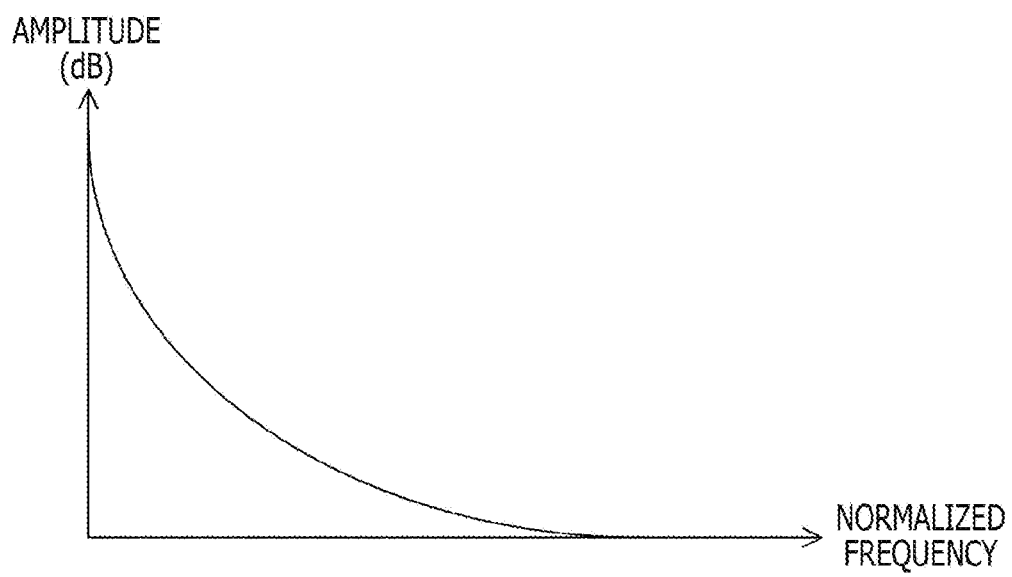
FIGS. 24A and 24B are graphs illustrating an example of a frequency characteristic of an infinite impulse response filter in the third embodiment of the present technology.
Figure 24B:
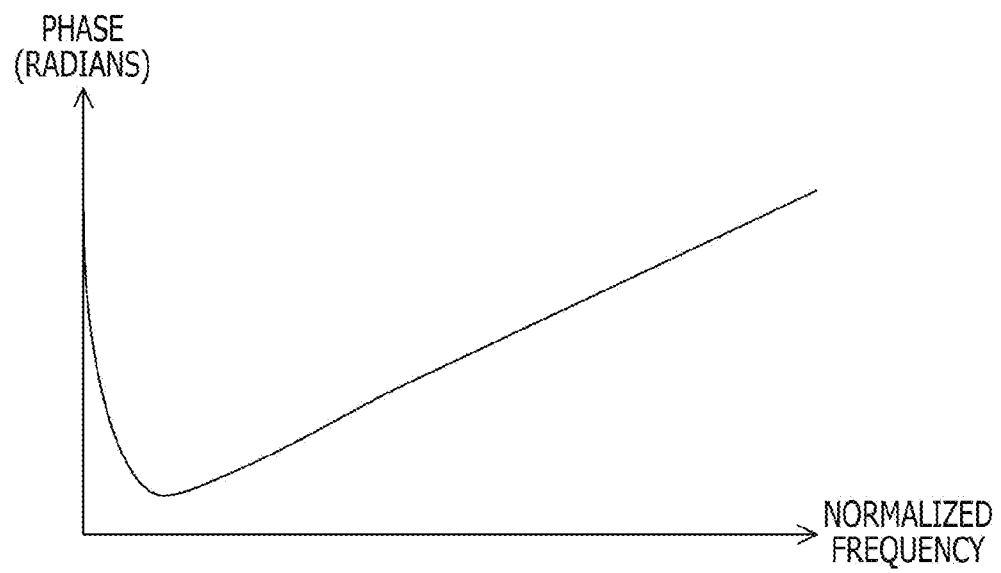

FIGS. 24A and 24B are graphs illustrating an example of a frequency characteristic of the infinite impulse response filter 370 in the third embodiment of the present technology. FIG. 24A is an example of a graph illustrating the relationship between an amplitude of the infinite impulse response filter 370 and a normalized frequency. FIG. 24B is an example of a graph illustrating the relationship between a phase of the infinite impulse response filter 370 and a normalized frequency. The vertical axis in FIG. 24A is an output amplitude from the infinite impulse response filter 370, and the horizontal axis is the normalized frequency. The vertical axis in FIG. 24B is an output phase from the infinite impulse response filter 370, and the horizontal axis is the normalized frequency.

FIGS. 24A and 24B indicate a frequency characteristic for a case where "32" is set for α in Formula 3. As exemplified by FIG. 24A, the amplitude decreases as the normalized frequency becomes high, and, as exemplified by FIG. 24B, the phase increases as the normalized frequency becomes high.

FIG. 25 is a timing chart illustrating an example of operation by the solid-state image capturing element 200 in a time period until generation of a third frame, in the third embodiment of the present technology.

In activation-time processing from timings T1 to T2, the correction value calculation section 320 calculates a correction value for each column for each of the gain domains d0 through d4, under control by the controller 360. The infinite impulse response filter 370 holds the correction value for each gain domain.

Then, in a video time period from the timing T2 to timing T21, the column signal processing section 280 generates a first frame F1. Next, in a vertical blanking time period, the controller 360 performs division processing from the timing T21 to timing T22. In this division processing, the correction value calculation section 320 calculates a correction value for each column for the gain domain d0 for the time of capturing of the frame F1. For the gain domain d0 for the time of capturing, the infinite impulse response filter 370 performs update by calculating a new correction value which reflects a held value in activation-time processing and an inputted correction value.

Then, in a video time period from the timing T3 to timing T31, the column signal processing section 280 generates a second frame F2. Next, in a vertical blanking time period, the controller 360 performs division processing from the timing T31 to timing T32. In this division processing, the correction value calculation section 320 calculates a correction value for each column for the gain domain d1 for the time of capturing of the frame F2. For the gain domain d1 for the time of capturing, the infinite impulse response filter 370 performs update by calculating a new correction value which reflects a held value in activation-time processing and an inputted correction value.

Because output from the infinite impulse response filter 370 gradually changes, the correction section 350 performs a correction according to the output from the infinite impulse response filter 370, whereby it is possible to suppress the signal level between frames from unnaturally changing.

Figure 26:
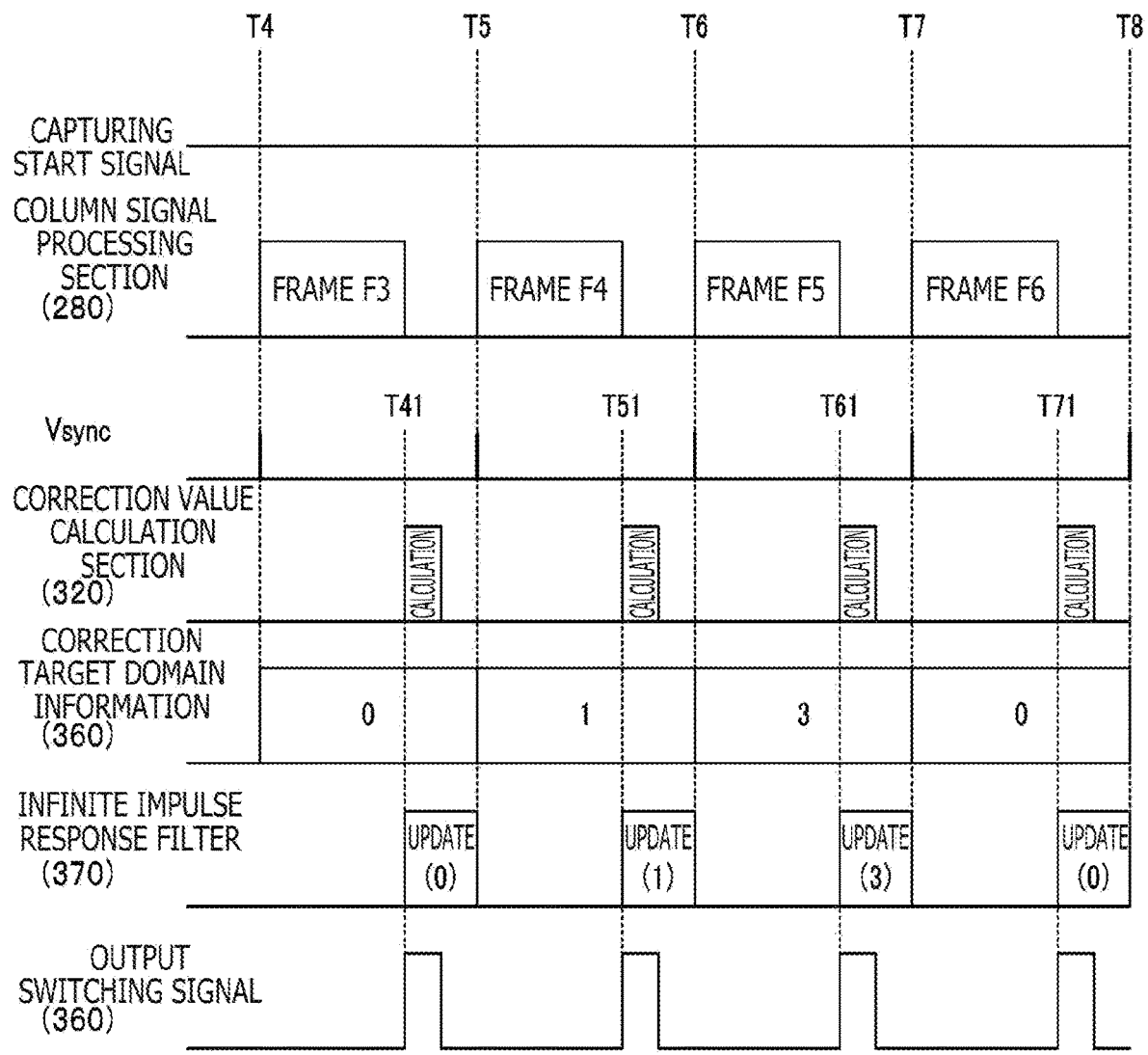
FIG. 26 is a timing chart illustrating an example of operation by a solid-state image capturing element in a time period until generation of a sixth frame, in the third embodiment of the present technology.

FIG. 26 is a timing chart illustrating an example of operation by the solid-state image capturing element 200 in a time period until generation of a sixth frame, in the third embodiment of the present technology.

In a vertical blanking time period from timings T41 to T5, the controller 360 performs division processing. In this division processing, the correction value calculation section 320 calculates a correction value for each column for the gain domain d0 for the time of capturing of a frame F3. For the gain domain d0 for the time of capturing, the infinite impulse response filter 370 performs update by calculating a new correction value which reflects a held value in activation-time processing, the correction value for immediately after the frame F1, and an inputted correction value. Similar division processing is executed at the timing T5 and thereafter.

Note that, because the gain domain is not updated for a long time in the division processing, it is desirable to hasten the speed of the infinite impulse response filter 370 when the gain domain changes. In addition, because there may be cases where, depending on the drive mode, update has stopped with, for example, a comparator that is caused to rest, it is desirable to hasten the speed of the infinite impulse response filter 370 when the drive mode is changed.

In such a manner, by virtue of the third embodiment of the present technology, because the infinite impulse response filter 370, for which output gradually changes, is provided and the correction section 350 performs a correction according to the output from the infinite impulse response filter 370, it is possible to suppress sudden change of the correction value.

4. Fourth Embodiment

In the third embodiment described above, in the activation-time processing, the test signal source 220 generates, for each gain domain, test signals for the number of samples that is the same as those at a time of division processing. However, with this configuration, the greater the number of gain domains or the number of samples is, the longer an amount of time required for the activation-time processing becomes. A solid-state image capturing element 200 according to this fourth embodiment differs from that in the third embodiment in that the number of gain domains for activation-time processing is reduced.

Figure 27:
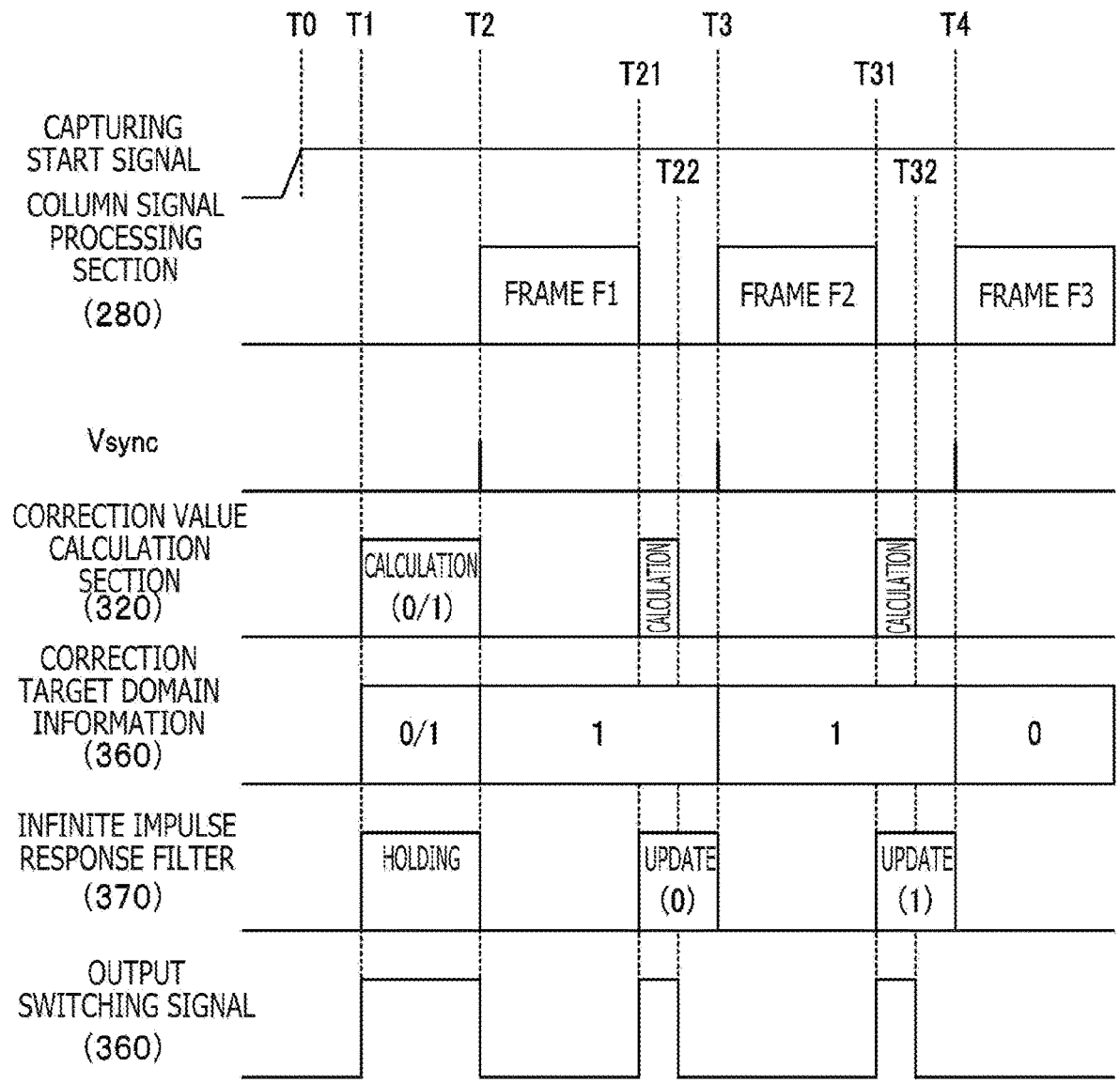
FIG. 27 is a timing chart illustrating an example of operation by a solid-state image capturing element in a fourth embodiment of the present technology.

FIG. 27 is a timing chart illustrating an example of operation by the solid-state image capturing element 200 in the fourth embodiment of the present technology. In activation-time processing from timings T1 to T2, the correction value calculation section 320 calculates correction values for a linearity correction reference gain domain d0, and a gain domain d1 used in an initial frame F1. As a result, it is possible to shorten the amount of time required for activation-time processing in comparison with the third embodiment in which calculations are performed for all gain domains in activation-time processing.

In such a manner, by virtue of the fourth embodiment of the present technology, because the correction value calculation section 320 calculates correction values for some gain domains in the activation-time processing, it is possible to shorten the amount of time required for the activation-time processing in comparison with a case of performing calculations for all gain domains.

5. Fifth Embodiment

In the third embodiment described above, an infinite impulse response filter 370 updates the gain domain for a time of capturing in the division processing. However, with this configuration, there is a risk that the correction accuracy will decrease for a gain domain having a low update frequency. A solid-state image capturing element 200 in this fifth embodiment differs from the fourth embodiment in that the correction value for a linearity correction reference gain domain d0 is also calculated at a time of division processing to thereby improve correction accuracy.

Figure 28:
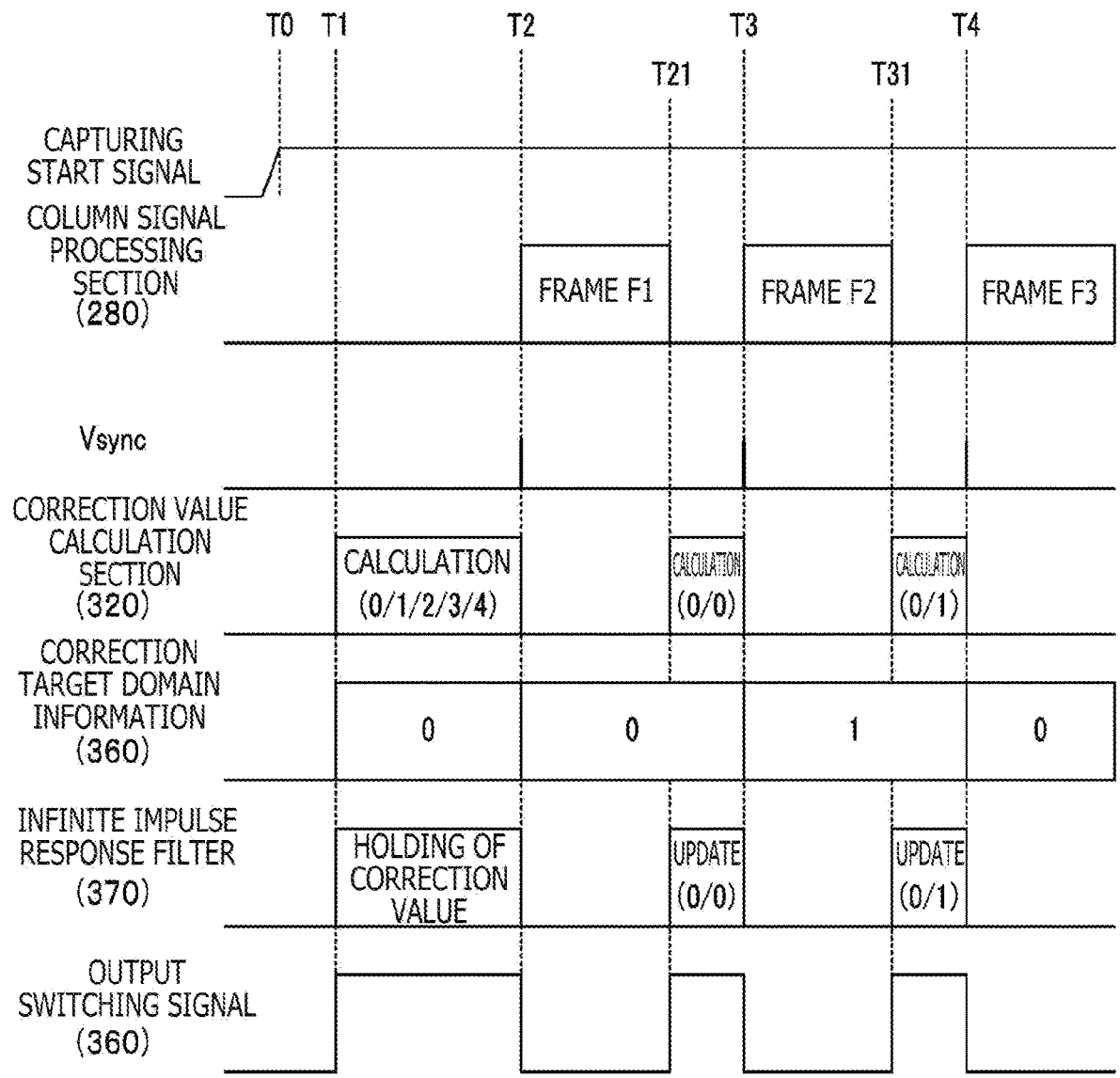
FIG. 28 is a timing chart illustrating an example of operation by a solid-state image capturing element in a time period until generation of a third frame, in a fifth embodiment of the present technology.

FIG. 28 is a timing chart illustrating an example of operation by the solid-state image capturing element 200 in a time period until generation of a third frame, in the fifth embodiment of the present technology.

In a vertical blanking time period from timing T21 to timing T3, a correction value calculation section 320 calculates the correction value for each column for both a reference gain domain d0 and a gain domain d0 for the time of capturing of a frame F1. The infinite impulse response filter 370 updates the correction value twice for the gain domain d0.

In addition, in a vertical blanking time period from timing T31 to timing T4, the correction value calculation section 320 calculates the correction value for each column for both the reference gain domain d0 and the gain domain d1 for the time of capturing of the frame F1. The infinite impulse response filter 370 updates the correction value for these gain domains d0 and d1.

Figure 29:
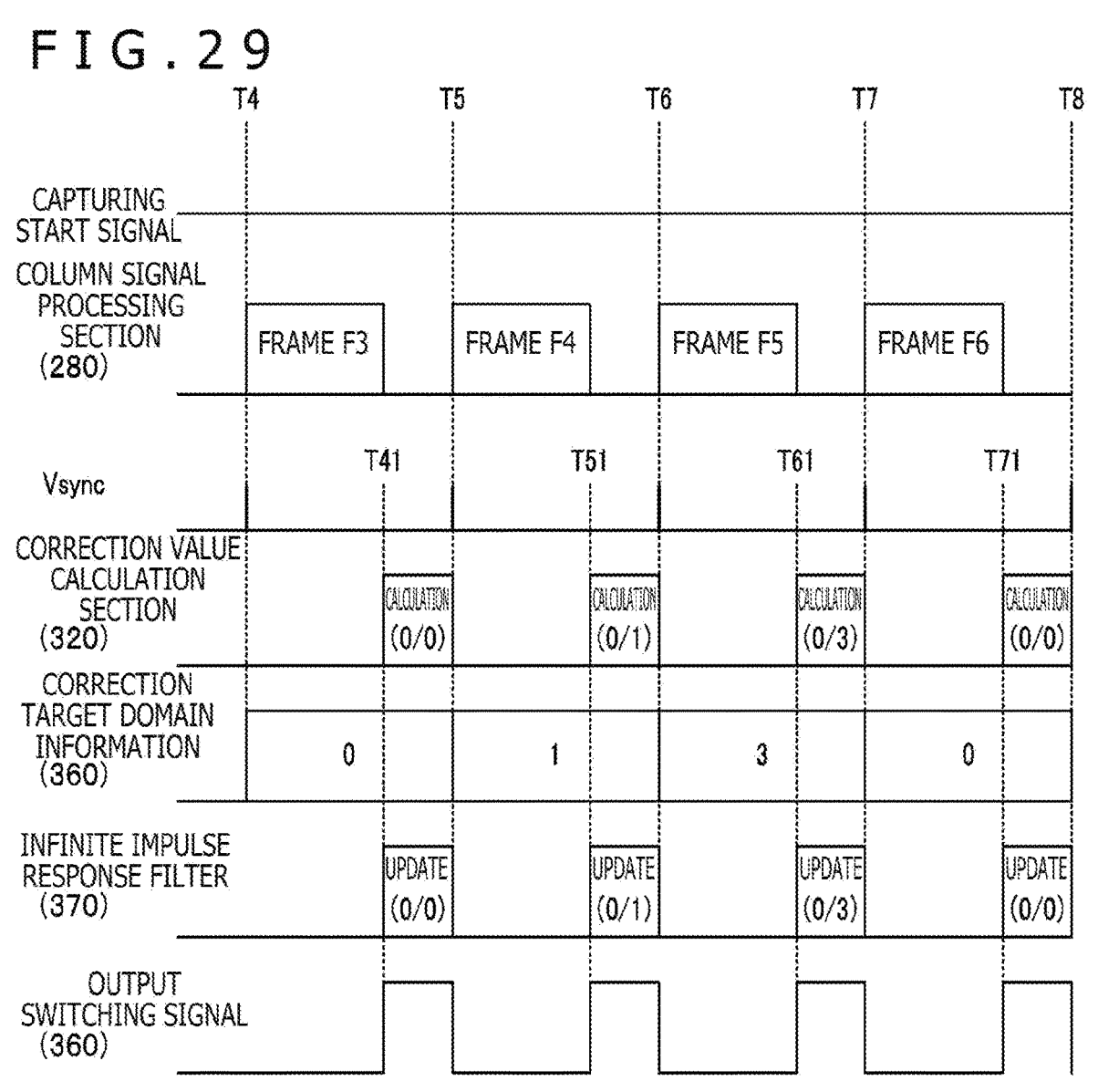

FIG. 29 is a timing chart illustrating an example of operation by the solid-state image capturing element 200 in a time period until generation of a sixth frame, in the fifth embodiment of the present technology.

In a vertical blanking time period from timing T41 to timing T5, the correction value calculation section 320 calculates the correction value for each column for both the reference gain domain d0 and the gain domain d0 for the time of capturing of the frame F1. The infinite impulse response filter 370 updates the correction value twice for the gain domain d0.

In addition, in a vertical blanking time period from timing T51 to timing T6, the correction value calculation section 320 calculates the correction value for each column for both the reference gain domain d0 and the gain domain d1 for the time of capturing of the frame F1. The infinite impulse response filter 370 updates the correction value for these gain domains d0 and d1.

In vertical blanking time periods from the timing T6 and thereafter, the correction value is similarly calculated for both the reference gain domain d0 and the gain domain for the time of capturing of a frame.

As exemplified in FIG. 28 and FIG. 29, at a time of division processing, the correction value calculation section 320 calculates the correction value for the reference gain domain d0 in addition to the gain domain for the time of capturing. Accordingly, it is possible to improve the correction accuracy in comparison with a case of calculating the correction value for only the gain domain for the time of capturing.

In such a manner, by virtue of the fifth embodiment of the present technology, because the correction value calculation section 320 calculates the correction value for the gain domain for the time of capturing and the reference gain domain, it is possible to improve the correction accuracy in comparison with a case of performing a calculation for only the gain domain for the time of capturing.

6. Example of Application to Mobile Body

The technique according to the present disclosure (the present technology) can be applied to various products. For example, the technique according to the present disclosure may be realized as an apparatus mounted to any of various types of mobile body, such as an automobile, an electric automobile, a hybrid electric vehicle, a motorcycle, a bicycle, a personal mobility, an airplane, a drone, a ship, or a robot.

Figure 30:
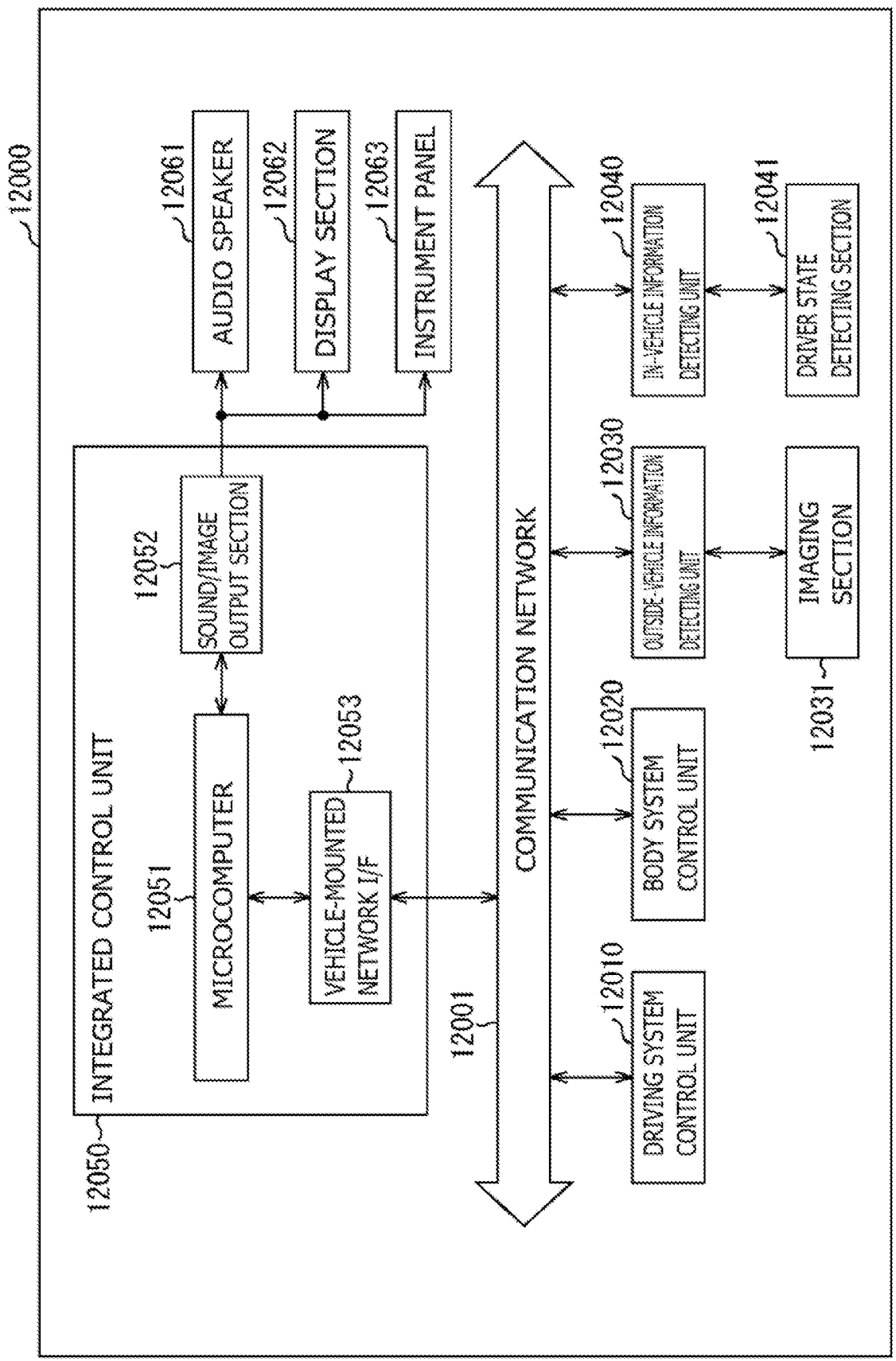
FIG. 30 is a block diagram depicting an example of schematic configuration of a vehicle control system.

FIG. 30 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 30, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle according to various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body according to various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, according to the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are illustrated as the output device. The display section 12062 may, for example, include at least one of an on-board display and a head-up display.

Figure 31:
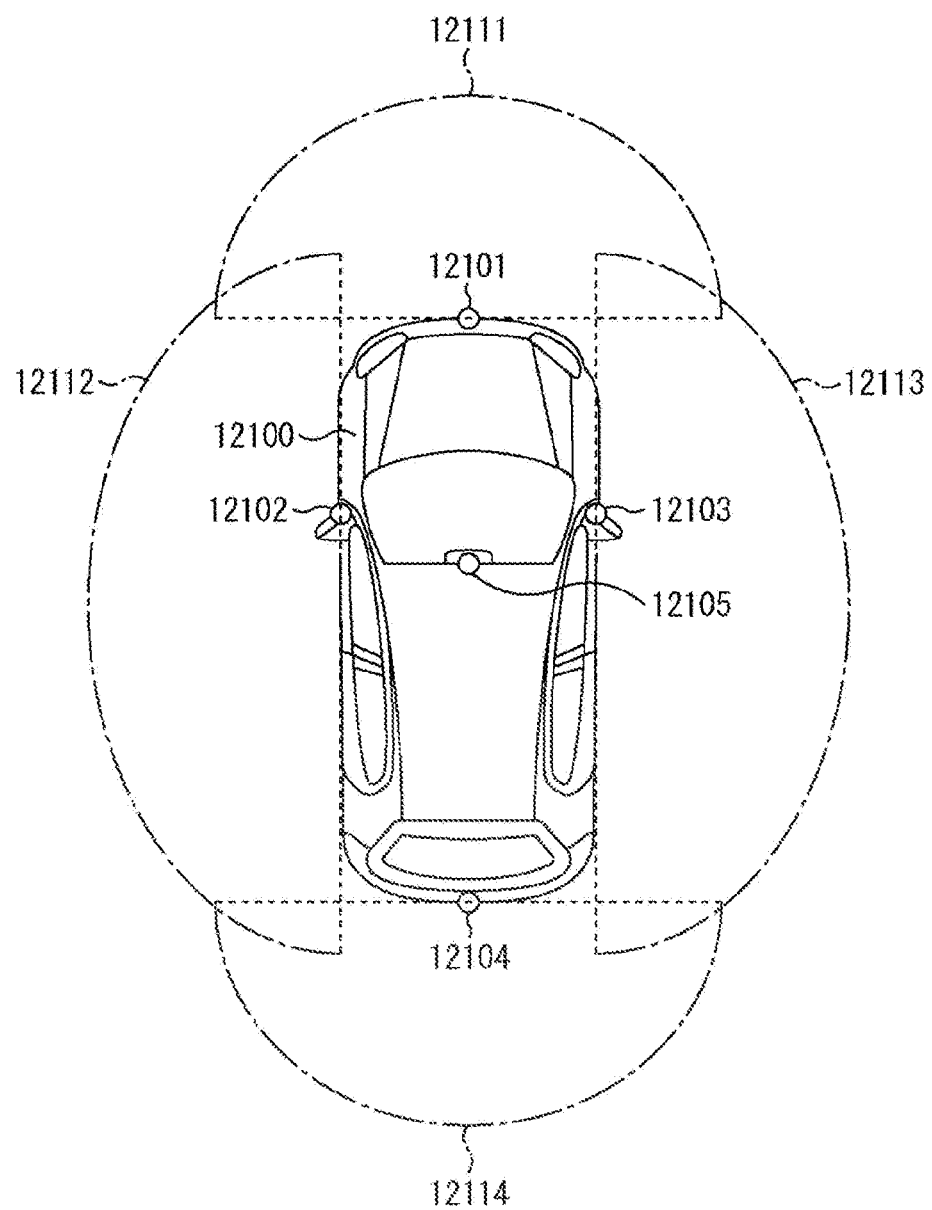
FIG. 31 is a diagram of assistance in explaining an example of an installation position of an imaging section.

FIG. 31 is a diagram depicting an example of the installation position of the imaging section 12031.

In FIG. 31, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 31 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Description is given above regarding an example of a vehicle control system to which the technique according to the present disclosure can be applied. From among the configurations described above, the technique according to the present disclosure can be applied to the imaging section 12031. Specifically, the image capturing apparatus 100 in FIG. 1 can be applied to the imaging section 12031. By applying the technique according to the present disclosure to the imaging section 12031, it is possible to remove fixed pattern noise and obtain a captured image that is easier to see, thus making it possible to reduce driver fatigue.

Note that the embodiments described above indicate examples for realizing the present technology. There are respective correspondences between features in the embodiments and invention-defining features in the claims. Similarly, there are respective correspondences between invention-defining features in the claims and features in the embodiments of the present technology to which the same name is added. However, the present technology is not limited to the embodiments and can be realized by applying various transformations to the embodiments in a range that does not deviate from the substance of the present technology.

Note that effects described in the present specification are purely exemplary and are not limiting, and there may be other effects.

Note that the present technology can also have the following configurations.

(1)

A solid-state image capturing element including:

an analog-to-digital converter configured to increase or decrease an analog signal using an analog gain selected from among a plurality of analog gains and convert the increased or decreased analog signal to a digital signal;

an input switching section configured to input, as the analog signal, one of a test signal having a predetermined level and a pixel signal to the analog-to-digital converter;

a correction value calculation section configured to obtain, from the test signal and the digital signal, a correction value for correcting an error in the selected analog gain and output the correction value; and a correction section configured to correct the digital signal using the outputted correction value.

(2)

The solid-state image capturing element according to (1), in which the analog-to-digital converter includes
a comparator configured to compare the analog signal with a predetermined ramp signal, and output a comparison result, and
a digital signal generation section configured to generate the digital signal on the basis of the comparison result,
the comparator includes
a differential amplification circuit configured to amplify a difference between a predetermined reference voltage and a voltage of a predetermined node and output the amplified difference as the comparison result,
a vertical signal line side capacitor inserted between the predetermined node and the input switching section,
a ramp side capacitor inserted between the predetermined node and a digital-to-analog converter that generates the ramp signal, and
a switch configured to change a capacitance ratio between the vertical signal line side capacitor and the ramp side capacitor according to a predetermined control signal, and
the plurality of analog gains are classified into a plurality of gain domains for which the capacitance ratio is mutually different.

(3)

The solid-state image capturing element according to (2), further including:

a controller configured to cause one gain domain from among the plurality of gain domains to be selected according to the control signal.

(4) The solid-state image capturing element according to (3), in which
the controller performs activation-time processing for causing each of the plurality of gain domains to be selected before a video time period in which the pixel signal is generated, and performs, in a vertical blanking time period in which the test signal is inputted, division processing for causing the gain domain to be changed in a predetermined order each time a predetermined number of frames are generated, and
the number of the digital signals which are in the activation-time processing and which respectively correspond to the plurality of gain domains is the same as the number of digital signals in the division processing.

(5) The solid-state image capturing element according to (3), in which
the controller performs activation-time processing for causing each of the plurality of gain domains to be selected before a video time period in which the pixel signal is generated, and performs, in a vertical blanking time period in which the test signal is inputted, division processing for causing the gain domain to be changed in a predetermined order each time a predetermined number of frames are generated, and
the number of the digital signals which are in the activation-time processing and which respectively correspond to the plurality of gain domains is less than the number of digital signals in the division processing.

(6) The solid-state image capturing element according to (3), further including:
a filter configured to gradually change a response to the outputted correction value, in which
the controller, in a vertical blanking time period in which the test signal is generated, performs division processing for causing a gain domain set in a video time period in which the pixel signal is generated to be selected.

(7) The solid-state image capturing element according to (6), in which
the controller further performs, before the video time period, activation-time processing for causing a predetermined reference domain from among the plurality of gain domains and a gain domain which is to be set in the video time period to be selected.

(8) The solid-state image capturing element according to (6), in which
the controller, before the video time period, further performs activation-time processing for causing each of the plurality of gain domains to be selected in order according to the control signal.

(9) The solid-state image capturing element according to (8), in which
the controller, in the vertical blanking time period, causes the set gain domain and the reference domain to be selected in order.

(10) An image capturing apparatus including:
a pixel array section in which a plurality of pixels, each generating a pixel signal, are arrayed;
an analog-to-digital converter configured to increase or decrease an analog signal using an analog gain selected from among a plurality of analog gains, and convert the increased or decreased analog signal to a digital signal;
an input switching section configured to input, as the analog signal, one of a test signal having a predetermined level and the pixel signal to the analog-to-digital converter;
a correction value calculation section configured to obtain, from the test signal and the digital signal, a correction value for correcting an error in the selected analog gain and output the correction value; and
a correction section configured to correct the digital signal using the outputted correction value.

(11) A method of controlling a solid-state image capturing element, the method including:
an analog-to-digital conversion procedure for increasing or decreasing an analog signal using an analog gain selected from among a plurality of analog gains, and converting the increased or decreased analog signal to a digital signal;
an input switching procedure for inputting, as the analog signal, one of a test signal having a predetermined level and a pixel signal to the analog-to-digital converter;
a correction value obtainment procedure for obtaining, from the test signal and the digital signal, a correction value, which is for correcting an error in the selected analog gain, and for outputting the correction value; and
a correction procedure for using the outputted correction value to correct the digital signal.

REFERENCE SIGNS LIST

100: Image capturing apparatus
110: Optical section
120: DSP circuit
130: Display section
140: Operation section
150: Bus
160: Frame memory
170: Storage section
180: Power supply section
200: Solid-state image capturing element
210: Vertical scan circuit
220: Test signal source
230: DAC
240: Timing control circuit
250: Pixel array section
260: Pixel
261: Photoelectric conversion element
262: Transfer transistor
263: Reset transistor
264: Floating diffusion layer
265: Amplifying transistor
266: Selection transistor
270: Input switching section
271, 340: Selector
280: Column signal processing section
281: ADC
282: Counter
300: Image processing section
310: Gain error measurement section
311: Number-of-samples counter
312: Update pulse generation section
313: Gain calculation section
314: Offset calculation section
320: Correction value calculation section
321: Gain correction coefficient calculation section 322: Offset correction coefficient calculation section
330, 376: Storage section
350: Correction section
360: Controller
370: Infinite impulse response filter
371: Adder
372: Subtractor
373, 374: Multiplier
375: Multiplexer
377: Demultiplexer
400: Comparator
410: Capacitance ratio switching circuit
411 to 415: Switch
416 to 421, 440: Capacitor
430: Differential amplification circuit
431, 432: pMOS transistor
433 to 435: nMOS transistor
436, 437: Auto-zero switch
12031: Imaging section

The invention claimed is:

1. A solid-state image capturing element, comprising:
an analog-to-digital converter configured to:
one of increase or decrease an analog signal based on an analog gain selected from a plurality of analog gains, and
convert the one of increased or decreased analog signal to a digital signal, wherein
the analog-to-digital converter includes:
a comparator configured to compare the analog signal with a specific ramp signal, and output a result of the comparison, and
a digital signal generation section configured to generate the digital signal based on the result of the comparison,
the comparator includes:
a differential amplification circuit configured to amplify a difference between a specific reference voltage and a voltage of a specific node, and output the amplified difference as the result of the comparison,
a vertical signal line side capacitor between the specific node and an input switching circuit,
a ramp side capacitor between the specific node and a digital-to-analog converter that generates the specific ramp signal, and
a switch configured to change a capacitance ratio between the vertical signal line side capacitor and the ramp side capacitor based on a specific control signal, and
the plurality of analog gains is classified into a plurality of gain domains for which the capacitance ratio is mutually different;
the input switching circuit configured to input, as the analog signal, one of a test signal having a specific level or a pixel signal to the analog-to-digital converter;
a correction value calculation section configured to:
obtain, from the test signal and the digital signal, a correction value to correct an error in the selected analog gain, and
output the correction value; and
a correction section configured to correct the digital signal based on the outputted correction value.

2. The solid-state image capturing element according to claim 1, further comprising a controller configured to select a gain domain from the plurality of gain domains based on the specific control signal.

3. The solid-state image capturing element according to claim 2, wherein
the controller is further configured to:
perform, before a video time period in which the pixel signal is generated, activation-time processing to select each of the plurality of gain domains, and
perform, in a vertical blanking time period in which the test signal is inputted, division processing to change the gain domain in a specific order each time a specific number of frames are generated, and
a number of digital signals which are in the activation-time processing and which respectively correspond to the plurality of gain domains is a same as the number of digital signals in the division processing.

4. The solid-state image capturing element according to claim 2, wherein
the controller is further configured to:
perform, before a video time period in which the pixel signal is generated, activation-time processing to select each of the plurality of gain domains, and
perform, in a vertical blanking time period in which the test signal is inputted, division processing to change the gain domain in a specific order each time a specific number of frames are generated, and
a number of digital signals which are in the activation-time processing and which respectively correspond to the plurality of gain domains is less than the number of digital signals in the division processing.

5. The solid-state image capturing element according to claim 2, further comprising a filter configured to gradually change a response to the outputted correction value,
wherein the controller is further configured to perform division processing, in a vertical blanking time period in which the test signal is generated, to select the gain domain set in a video time period in which the pixel signal is generated.

6. The solid-state image capturing element according to claim 5, wherein the controller is further configured to perform, before the video time period, activation-time processing to select a specific reference domain from the plurality of gain domains and the gain domain set in the video time period.

7. The solid-state image capturing element according to claim 5, wherein the controller is further configured to perform, before the video time period, activation-time processing to select each of the plurality of gain domains in order based on the specific control signal.

8. The solid-state image capturing element according to claim 7, wherein the controller is further configured to select, in the vertical blanking time period, the gain domain and a specific reference domain of the plurality of gain domains in order.

9. The solid-state image capturing element according to claim 1, wherein
the correction value calculation section includes:
a gain correction coefficient calculation section configured to calculate a value of a gain correction coefficient to correct the error in the selected analog gain, and
an offset correction coefficient calculation section configured to calculate a value of an offset correction coefficient to correct an offset error, and
the correction value includes the value of the gain correction coefficient and the value of the offset correction coefficient.

10. An image capturing apparatus, comprising:
a pixel array section that includes a plurality of pixels, wherein each of the plurality of pixels is configured to generate a pixel signal;
an analog-to-digital converter configured to:
one of increase or decrease an analog signal based on an analog gain selected from a plurality of analog gains, and
convert the one of increased or decreased analog signal to a digital signal, wherein
the analog-to-digital converter includes:
a comparator configured to compare the analog signal with a specific ramp signal, and output a result of the comparison, and
a digital signal generation section configured to generate the digital signal based on the result of the comparison,
the comparator includes:
a differential amplification circuit configured to amplify a difference between a specific reference voltage and a voltage of a specific node, and output the amplified difference as the result of the comparison,
a vertical signal line side capacitor between the specific node and an input switching circuit,
a ramp side capacitor between the specific node and a digital-to-analog converter that generates the specific ramp signal, and
a switch configured to change a capacitance ratio between the vertical signal line side capacitor and the ramp side capacitor based on a specific control signal, and
the plurality of analog gains is classified into a plurality of gain domains for which the capacitance ratio is mutually different;
the input switching circuit configured to input, as the analog signal, one of a test signal having a specific level or the pixel signal to the analog-to-digital converter;
a correction value calculation section configured to:
obtain, from the test signal and the digital signal, a correction value to correct an error in the selected analog gain, and
output the correction value; and
a correction section configured to correct the digital signal based on the outputted correction value.

11. A method of controlling a solid-state image capturing element, the method comprising:
one of increasing or decreasing, by an analog-to-digital converter of the solid-state image capturing element, an analog signal based on an analog gain selected from a plurality of analog gains;
converting, by the analog-to-digital converter, the one of increased or decreased analog signal to a digital signal, wherein
the analog-to-digital converter includes a comparator and a digital signal generation section, and
the comparator includes a differential amplification circuit, a vertical signal line side capacitor, a ramp side capacitor, and a switch;
comparing, by the comparator, the analog signal with a specific ramp signal and outputting a result of the comparison;
generating, by the digital signal generation section, the digital signal based on the result of the comparison;
amplifying, by the differential amplification circuit, a difference between a specific reference voltage and a voltage of a specific node, and outputting the amplified difference as the result of the comparison, wherein
the vertical signal line side capacitor is between the specific node and an input switching circuit of the solid-state image capturing element, and
the ramp side capacitor is between the specific node and a digital-to-analog converter that generates the specific ramp signal;
changing, by the switch, a capacitance ratio between the vertical signal line side capacitor and the ramp side capacitor based on a specific control signal,
wherein the plurality of analog gains is classified into a plurality of gain domains for which the capacitance ratio is mutually different;
inputting, by the input switching circuit, as the analog signal, one of a test signal having a specific level or a pixel signal to the analog-to-digital converter;
obtaining, by a correction value calculation section of the solid-state image capturing element, from the test signal and the digital signal, a correction value which is for correcting an error in the selected analog gain;
outputting, by the correction value calculation section, the correction value; and
correcting, by a correction section of the solid-state image capturing element, the digital signal based on the outputted correction value.

* * * * *